(12) United States Patent
Suematsu et al.

(10) Patent No.: US 9,028,570 B2
(45) Date of Patent: May 12, 2015

(54) ODORANT ADDITION DEVICE AND FUEL GAS SUPPLY SYSTEM

(75) Inventors: Keigo Suematsu, Susono (JP); Makoto Ueno, Mishima (JP); Tatsuaki Yokoyama, Susono (JP); Hiroshi Fujitani, Gotenba (JP); Atsushi Matsuba, Mishima (JP); Shuji Hirakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 753 days.

(21) Appl. No.: 12/450,890

(22) PCT Filed: Apr. 10, 2008

(86) PCT No.: PCT/JP2008/057098
§ 371 (c)(1),
(2), (4) Date: Dec. 29, 2009

(87) PCT Pub. No.: WO2008/133022
PCT Pub. Date: Nov. 6, 2008

(65) Prior Publication Data
US 2010/0101306 A1    Apr. 29, 2010

(30) Foreign Application Priority Data

Apr. 19, 2007    (JP) .................................. 2007-110327

(51) Int. Cl.
| | |
|---|---|
| *C10J 1/28* | (2006.01) |
| *C01B 3/00* | (2006.01) |
| *C10L 3/00* | (2006.01) |
| *H01M 8/04* | (2006.01) |
| *H01M 8/06* | (2006.01) |

(52) U.S. Cl.
CPC ............. *C01B 3/0031* (2013.01); *C01B 3/0005* (2013.01); *C01B 2203/066* (2013.01); *C10L 3/006* (2013.01); *H01M 8/04089* (2013.01); *H01M 8/0662* (2013.01); *H01M 2250/20* (2013.01); *Y02E 60/327* (2013.01); *Y02E 60/50* (2013.01); *Y02T 90/32* (2013.01)

(58) Field of Classification Search
USPC ......................................................... 48/195
See application file for complete search history.

(56) References Cited

U.S. PATENT DOCUMENTS

| | | |
|---|---|---|
| 3,169,839 A | 2/1965 | Calva |
| 5,167,867 A | 12/1992 | Quaife et al. |

(Continued)

FOREIGN PATENT DOCUMENTS

| | | |
|---|---|---|
| EP | 1 653 148 A1 | 5/2006 |
| JP | A 10-115587 | 5/1998 |
| JP | A 2002-29701 | 1/2002 |
| JP | A 2004-111167 | 4/2004 |

(Continued)

*Primary Examiner* — Matthew Merkling
(74) *Attorney, Agent, or Firm* — Oliff PLC

(57) ABSTRACT

An odorant addition device for adding odorant to fuel gas in a gas system that consumes the fuel gas, the device including: an addition unit for adding the odorant to fuel gas to be consumed by the gas system; an environmental condition detection unit for detecting in the gas system an environmental condition regarding diffusion of odorant in fuel gas; and an addition adjustment unit for adjusting mode of odorant addition by the addition unit based on the environmental condition detected by the environmental condition detection unit. In this way, it is possible to detect leakage of fuel gas more reliably and improve safety dramatically, in a gas system that consumes the fuel gas as fuel.

4 Claims, 15 Drawing Sheets

(56) References Cited

U.S. PATENT DOCUMENTS

2001/0047621 A1* 12/2001 Arnold ............................ 48/195
2009/0110990 A1   4/2009 Izutani et al.

FOREIGN PATENT DOCUMENTS

| KE | A-1984-219392 | 12/1984 |
| WO | WO 2007/029748 A1 | 3/2007 |

* cited by examiner

ODORANT ADDITION DEVICE AND FUEL GAS SUPPLY SYSTEM

CROSS-REFERENCE TO RELATED APPLICATION

This application is the national phase application under 35 U.S.C. §371 of PCT international application No. PCT/JP2008/057098 filed on Apr. 10, 2008, which claims the benefit of priority of the prior Japanese Patent Application No. 2007-110327, filed on Apr. 19, 2007, the entire contents of which are incorporated herein by reference.

TECHNICAL FIELD OF THE INVENTION

The present invention relates to an odorant addition device for adding odorant used for detection of leakage of fuel gas to fuel gas, in a gas system that operates by consuming the fuel gas as fuel.

BACKGROUND ART

In a gas system such as a fuel cell system that generates power by using fuel gas such as hydrogen gas as fuel, odorant is added to the fuel gas for detection of leakage of fuel gas. This enables a person to know leakage of fuel gas by using his/her olfactory sense to detect odorant that leaks along with the fuel gas.

However, odorant may sometimes interfere with function to be fulfilled by a gas system. For example, in a fuel cell system, if fuel gas (hydrogen) that contains much odorant is supplied to a fuel cell, it may result in a decrease in generating efficiency of the fuel cell. A technique is therefore disclosed that maintains concentration of odorant in fuel gas to be supplied to a fuel cell within a predetermined range (see Japanese Patent Application Laid-Open No. 2004-111167). In this technique, concentration of odorant to be supplied to a fuel cell can be maintained within a predetermined range by unit of an odorant concentration control unit that is provided upstream of the fuel cell and a circulation channel for its fuel gas. Other conventional techniques are also disclosed in Japanese Patent Application Laid-Open No. H10-115587 and Japanese Patent Application Laid-Open No. 2002-29701.

SUMMARY OF THE INVENTION

Problem to be Solved by the Invention

In a gas system that uses fuel gas as fuel, leakage of fuel gas is not easy to be detected especially if the fuel gas is colorless and odorless. From a safety point of view, therefore, it may be necessary to add odorant to fuel gas in order for leakage of the fuel gas to be detectable with olfactory sense of human. With such addition of odorant to fuel gas, it becomes possible to prepare for eventualities.

However, even if fuel gas that contains odorant is supplied to a gas system that consumes the fuel gas, there still exist various disturbance factors that prevent olfactory sense of human from detecting leakage of fuel gas in the gas system. That is, optimal mode of odorant addition to fuel gas is not always fixed, but may be varied based on various factors. If leakage of fuel gas continues in a non-optimal state, it may lead to some situation not preferred for safety of the gas system.

The present invention is made in view of the aforementioned problems, and is purposed to provide a technique for detecting leakage of fuel gas more reliably and for improving safety dramatically, in a gas system that consumes the fuel gas as fuel.

In the present invention, in order to solve the aforementioned problems, an attention was paid first to an environmental condition that influences diffusion of odorant between a gas system and a person around the system i.e. a person who should detect leakage of fuel gas. By making various adjustments on mode of odorant addition to fuel gas according to this environmental condition, it is possible to enable the person to detect leakage of fuel gas more reliably.

In detail, the present invention is directed to an odorant addition device for adding odorant to fuel gas in a gas system that consumes the fuel gas, the device including: an addition unit for adding the odorant to fuel gas to be consumed by the gas system; an environmental condition detection unit for detecting in the gas system an environmental condition regarding diffusion of odorant in fuel gas; and an addition adjustment unit for adjusting mode of odorant addition by the addition unit based on the environmental condition detected by the environmental condition detection unit.

The odorant addition device according to the present invention employs the addition unit to add odorant to fuel gas. Therefore, in the gas system that consumes fuel gas with odorant added, it is possible to detect leakage of fuel gas based on odor of odorant even in the event of fuel gas leakage. However, as described above, depending on the environmental condition around the gas system and related with diffusion of odorant, it may sometimes be difficult for a person to detect odor of odorant to a satisfactory level, even if fuel gas that leaked out of the gas system contains odorant therein. For example, if a concentration of odorant is so low to be out of a detectable range of a person at the time when the odorant reached the person, it may be difficult for the person to detect leakage of fuel gas.

Accordingly, in the odorant addition device according to the present invention, the environmental condition detection unit is used to detect the environmental condition, and based on that result of detection, the addition adjustment unit adjusts mode of odorant addition by the addition unit. That is, in the odorant addition device according to the present invention, mode of odorant addition to fuel gas is not always fixed, but rather, addition of odorant to fuel gas is performed in consideration of the environmental condition that is variable with time, in such a way that makes odorant in fuel gas well enough detectable by a person at the time when it reached the person. In this way, it is possible to detect fuel gas reliably even in the event of fuel gas leakage, regardless of the environmental condition in the gas system.

Note that the gas system itself may either be a fixed type or a mobile type, as long as it consumes fuel gas as fuel to fulfill some function. Examples of the fixed type gas system may include a fixed type power generation device that generates power by using fuel gas as fuel and a combustion device that performs combustion of fuel gas. Examples of the mobile type gas system include a mobile body such as a vehicle or a vessel, a robot, and the like that is equipped with a power generation device that generates power in a similar manner.

Here, the addition adjustment unit may also adjust at least one of amount of odorant to be added in fuel gas, concentration of the odorant, type of odorant to be added by the addition unit, and mix ratio between odorants if multiple types of odorants are added by the addition unit, in order to enable a user outside the gas system to detect leakage of fuel gas. That is, these are examples of mode of odorant addition i.e. examples of target to be adjusted by the addition adjustment unit. If the detected environmental condition is such a condition that makes detection by a user (person) difficult, the addition adjustment unit may increase the amount of odorant to be added, increases the concentration of the odorant, selectively uses odorant of more easy-to-be-detected type i.e. odorant with more strong odor, and if multiple types of odorants are used, adjusts the mix ratio between odorants so as to make odor stronger, in order to enable the user to make detection.

To the contrary, if the detected environmental condition is such a condition that allows for detection by a user (person) but odor of odorant is too strong to a level that brings discomfort to olfactory sense of the user, it is considered that normal detection is difficult, and the addition adjustment unit may reduce the amount of odorant to be added, for example, so as to enable the user to detect leakage of fuel gas more appropriately.

Here, in the afore-mentioned odorant addition device, the environmental condition detection unit may also be configured to detect a state of outside air around the gas system as the environmental condition. As a matter of course, there is outside air surrounding the gas system between the gas system and a person who may detect leakage of fuel gas, and diffusion of odorant depends heavily on this state of outside air. Therefore, by using the state of outside air as the environmental condition, it is possible to perform adjustment on mode of odorant addition more appropriately.

For example, as for the state of outside air, at least one of temperature, humidity, atmospheric pressure of the outside air, wind velocity caused by the outside air, and types of gas components constituting the outside air may be adopted, either of them being a state of outside air related with diffusion of fuel gas that contains odorant therein. Although outside air is generally a mixture gas of oxygen and nitrogen in usual, a presence of other gas component may sometimes make odor of odorant difficult to reach a person. In such case, mode of odorant addition is adjusted by adopting the presence of such gas component as the environmental condition.

The environmental condition detection unit may also be configured to detect a geographical condition at which the gas system is placed, as the environmental condition. If it is possible, to some degree, to detect a condition related with diffusion of odorant based on a geographical condition, rather than directly detecting a state of outside air as described above, the geographical condition may be adopted as the environmental condition. For example, geographical conditions such as locational information regarding a district or country having strong odor in outside air, altitude at which the gas system is placed, whether the gas system is installed indoor or outdoor, may be considered for adoption.

In the afore-mentioned odorant addition device, in the case where the environmental condition detection unit detects a relative velocity of outside air relative to the gas system as the environmental condition, the addition adjustment unit may prohibit addition of odorant by the addition unit, or may reduce amount of odorant to be added to lower than or equal to a predetermined amount regardless of status of fuel gas consumption within the gas system, if the outside air velocity detected by the environmental condition detection unit exceeds a predetermined velocity.

The higher the relative velocity of outside air relative to the gas system becomes, the wider the odorant contained in fuel gas diffuses in the event of leakage of fuel gas from the gas system, and thus, the less easy it becomes for a person to detect leakage of the fuel gas. Of course, up to some degree of relative velocity, mode of odorant addition may be adjusted as described above so as to enable a person to make detection, but once the relative velocity of outside air exceeds a predetermined velocity, diffusion of odorant becomes extremely pronounced, which may result in unnecessary consumption of odorant. Therefore, in the odorant addition device according to the present invention, once the relative velocity of outside air exceeds a predetermined velocity, addition of odorant is restricted by the addition adjustment unit, thereby avoiding unnecessary consumption of odorant. Note that term "relative velocity of outside air" used herein also covers outside air velocity of the case where the gas system does not move, relative velocity due to flow of outside air caused by movement of the gas system, and the like.

In the odorant addition device described hereinabove, if the environmental condition detected by the environmental condition detection unit is such an environmental condition that makes odor of odorant stronger than a predetermined level, then the addition adjustment unit may reduce amount of odorant to be added by the addition unit. That is, although odorant should be added to a level that is sufficient for a person to detect leakage of fuel gas, it is not necessary to make odor of odorant strong to a level that brings discomfort to the person. In addition, since discomfort brought to a person may vary depending on the environment condition, in the odorant addition device according to the present invention, amount of odorant to be added is reduced by adjustment by the addition adjustment unit such that odor is not strong to a level that is determined as bringing discomfort to a person.

In the present invention, in order to solve the aforementioned problems, an attention was paid next to an internal environmental condition of a gas system, that is, an environmental condition that may influence effect of odorant. By making various adjustments on mode of odorant addition to fuel gas according to this environmental condition, it is possible to enable a person to detect leakage of fuel gas more reliably.

In detail, the present invention relates to an odorant addition device for adding odorant to fuel gas in a gas system that consumes the fuel gas, the device including: an addition unit for adding the odorant to fuel gas to be consumed by the gas system; an environmental condition detection unit for detecting an internal environmental condition of the gas system, the environmental condition being related with odorant in fuel gas to be supplied to the gas system; and an addition adjustment unit for adjusting mode of odorant addition by the addition unit based on the environmental condition detected by the environmental condition detection unit.

The afore-mentioned odorant addition device adjusts mode of odorant addition to fuel gas based on an environmental condition that is different from that of the previous odorant addition device. That is, the environmental condition to be basis is an internal environmental condition of the gas system related with odorant. The state of odorant in fuel gas at the time of fuel gas leakage may vary according to the internal environmental condition of the gas system. Therefore, mode of odorant addition to fuel gas is not always fixed, but rather, addition of odorant to fuel gas is performed in consideration of the internal environmental condition of the gas system, in such a way that makes odorant in fuel gas well enough detectable by a person at the time when it reached the person. In this way, it is possible to detect fuel gas reliably even in the event of fuel gas leakage, regardless of the environmental condition in the gas system.

As with the previous odorant addition device, in the afore-mentioned odorant addition device, the addition adjustment unit may adjust at least one of amount of odorant to be added in fuel gas, concentration of the odorant, type of odorant to be added by the addition unit, mix ratio between odorants if multiple types of odorants are added by the addition unit, in order to enable a user outside the gas system to detect leakage of fuel gas.

In addition, the environmental condition detection unit may detect a predetermined parameter related with a state of consumption of fuel gas to be consumed in the gas system as the environmental condition. That is, tendency of fuel gas to leak, which is attributed to consumption of fuel gas in the gas system, will be taken into consideration. Usually, the larger the cumulative amount of consumed fuel gas grows, the more the deterioration of the gas system is advanced, and thus the more pronounced the leakage of fuel gas becomes. Therefore, when deterioration of the gas system is advanced, a person can detect leakage of fuel gas easily even if only a small amount of odorant is contained in the fuel gas. Such a parameter that is related with a state of consumption of fuel gas can thus be adopted as the environmental condition.

Note that this predetermined parameter may also be a history of fuel gas consumption in the gas system. In such case, mode of odorant addition is adjusted by the addition adjustment unit based on the history of fuel gas consumption, that is, based on how much fuel gas has been consumed in the gas system. More specifically, cumulative amount of consumed fuel gas, time elapsed for consumption of fuel gas i.e. time elapsed for operation of the gas system, and the like are applicable as the history of consumption.

Here, in the afore-mentioned odorant addition device, the gas system has a storage device for storing fuel gas to be consumed and a consumption device for consuming fuel gas stored in the storage device, and the environmental condition detection unit detects at least one of a parameter related with storage performance of the storage device with respect to odorant in fuel gas and a parameter related with deterioration resistance of the consumption device against odorant in the fuel gas, as the environmental condition.

There are various possible types of storage devices that may be responsible for storing fuel gas in the gas system. The type of storage device to be adopted is determined based on various factors such as mode of fuel gas consumption in the gas system, safety of the gas system itself, and the like. More specifically, a high pressure tank that stores fuel gas in a pressurized state, an occlusion alloy that occludes fuel gas, and the like can be adopted as the storage device according to the present invention, and influence of odorant on storage device, storage characteristic of odorant itself, and the like may vary for each case. Therefore, by having the addition adjustment unit to adjust mode of odorant addition in consideration of these factors, addition of odorant can be performed more appropriately, which makes it possible to detect fuel gas reliably even in the event of fuel gas leakage.

In the afore-mentioned odorant addition device, if the gas system receives supply of fuel gas to be consumed within the gas system from a fuel gas supply system that is arranged outside the gas system, then the environmental condition detection unit may detect a predetermined state of odorant in fuel gas to be supplied from the fuel gas supply system to the gas system, as the environmental condition. This predetermined state refers to various states regarding odorant at the time when fuel gas is supplied externally to the gas system, including presence or absence of odorant in the supplied fuel gas, and concentration and type of odorant in case of presence, and the like. Since the fuel gas supply system is designed to supply fuel gas to various types of gas systems, the fuel gas supplied by the fuel gas supply system not necessarily contains odorant in a state suitable to the target gas system. In the odorant addition device according to the present invention, therefore, mode of odorant addition is adjusted by the addition adjustment unit in order for odorant in fuel gas to be in a state suitable to the gas system. In this way, it is possible to detect fuel gas reliably even in the event of fuel gas leakage.

Further, in the odorant addition device described hereinabove, the addition adjustment unit may control amount of odorant to be added by the addition unit based on the environmental condition detected by the environmental condition detection unit. This illustrates an example of adjustment to be performed by the addition adjustment unit with respect to mode of odorant addition.

Further, in the odorant addition device described hereinabove, if the addition unit is capable of adding multiple types of odorants having different odor characteristics to fuel gas to be consumed by the gas system, then the addition adjustment unit may adjust mix ratio between the respective odorants to be added by the addition unit based on the environmental condition detected by the environmental condition detection unit. It is possible to change intensity of odor, type of odor, and the like of odorant to be felt by a person by mixing multiple types of odorants in varying mix ratios. Therefore, the addition adjustment unit adjusts the mix ratio between odorants based on the environmental condition related with the gas system and described hereinabove, thereby allowing for more efficient detection of fuel gas leakage.

Here, in the odorant addition device described hereinabove, if the gas system receives supply of fuel gas to be consumed within the gas system from a fuel gas supply system that is arranged outside the gas system, then the addition unit may be provided on at least one of the gas system's side and the fuel gas supply system's side. If the addition unit of the odorant addition unit is provided on the gas system's side, then it is possible to reflect change in the afore-mentioned environmental condition, which may occur after the gas system received supply of fuel gas, into mode of odorant addition. On the other hand, if the addition unit is provided on the fuel gas supply system's side, then it is possible to supply fuel gas in a state with more suitable odorant added thereto, based on the afore-mentioned environmental condition at the time of the fuel supply.

Further, the present invention can also be viewed from an aspect of a fuel gas supply system for supplying fuel gas to a gas system. One example is a fuel gas supply system for externally supplying fuel gas to a gas system that consumes the fuel gas, including: an addition unit for adding odorant to fuel gas to be supplied to the gas system; and an addition adjustment unit for adjusting mode of odorant addition by the addition unit to fuel gas, based on place where fuel gas is consumed by the gas system. In this fuel gas supply system, mode of odorant addition is adjusted based on place where fuel gas is consumed by the gas system. This adjustment of mode of addition is similar to that by the odorant addition device described above.

Effect of the Invention

With an odorant addition device according to the present invention, it is possible to detect leakage of fuel gas more reliably and improve safety dramatically, in a gas system that consumes the fuel gas as fuel.

DESCRIPTION OF SYMBOLS

Figure 1:
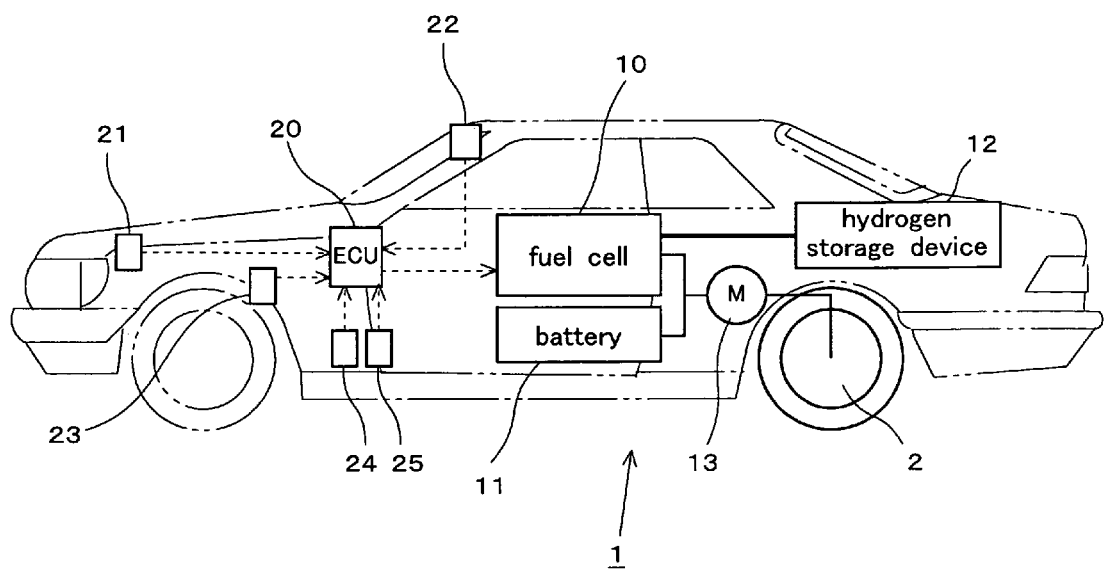
FIG. 1 is an illustration showing a schematic configuration of a vehicle that is equipped with a fuel cell system to which an odorant addition device according to an embodiment of the present invention is applied.

1 . . . vehicle
2 . . . drive wheel
10 . . . fuel cell
11 . . . battery
12 . . . hydrogen storage device
20 . . . ECU
21 . . . hygrothermal sensor
22 . . . GPS sensor
23 . . . atmospheric pressure sensor
24 . . . gas component sensor
25 . . . wind velocity sensor
26 . . . pressure sensor
100 . . . fuel cell system
101, 102 . . . hydrogen supply channel
105, 115, 125 . . . odorant addition device
120 . . . fuel cell-use hydrogen tank (hydrogen tank)
200 . . . hydrogen gas supply system
202 . . . hydrogen supply channel
205, 215, 225 . . . odorant addition device
220 . . . supply-side ECU

BEST MODE FOR EMBODYING THE INVENTION

A mode for embodying an odorant addition device according to the present invention will now be described based on the drawings.

Embodiment 1

A gas system to which the afore-mentioned odorant addition device is applied is a fuel cell system 100 (see FIG. 2 and the like) that generates power by using hydrogen gas as fuel gas. The fuel cell system 100 is mounted on a vehicle 1 (see FIG. 1) that is a moving body. Note that this is not intended to limit applicable scope of the odorant addition device according to the present invention to an odorant addition device applied to a fuel cell system.

FIG. 1 is a schematic illustration showing an arrangement of components, such as a fuel cell 10, of the fuel cell system 100 within the vehicle 1. The fuel cell 10 is a device that generates power by using hydrogen gas stored in a hydrogen storage device 12 as fuel. Some of power generated by the fuel cell 10 is charged in a battery 11, and a drive motor 13 is driven with power supplied from the fuel cell 10 and the battery 11 to drive drive wheels 2 of the vehicle 1, thus resulting in self-run of the vehicle 1. Note that in FIG. 1, wirings for electrically connecting the fuel cell 10, the battery 11, and the drive motor 13 are not described in detail.

Controls to be executed in the vehicle 1 in relation to the fuel cell 10, including control of the odorant addition device according to the present invention, are executed by an ECU 20. Various sensors 21 through 25 are also electrically connected to the ECU 20, so that any parameter necessary for control of the fuel cell 10 and control of the odorant addition device that will be described later can be provided to the ECU 20. The sensor represented by a reference number of 21 is a hygrothermal sensor 21 that detects temperature and humidity of outside air outside the fuel cell system. The sensor represented by a reference number of 22 is a GPS sensor 22 for use with GPS (Global Positioning System), that receives satellite signals to keep track of location of the vehicle 1. The sensor represented by a reference number of 23 is an atmospheric pressure sensor 23 that detects atmospheric pressure of outside air outside the fuel cell system. The sensor represented by a reference number of 24 is a gas component sensor 24 that detects gas (especially gas that acts on olfactory sense of human) component contained in outside air outside the fuel cell system. The sensor represented by a reference number of 25 is a wind velocity sensor 25 that detects relative velocity of outside air outside the fuel cell system i.e. wind velocity of outside air relative to the vehicle 1. Note that the wind velocity sensor 25 may alternatively be a vehicle velocity sensor that detects velocity of the vehicle 1 in a relative relationship with wind velocity, rather than directly measuring wind velocity.

Figure 2:
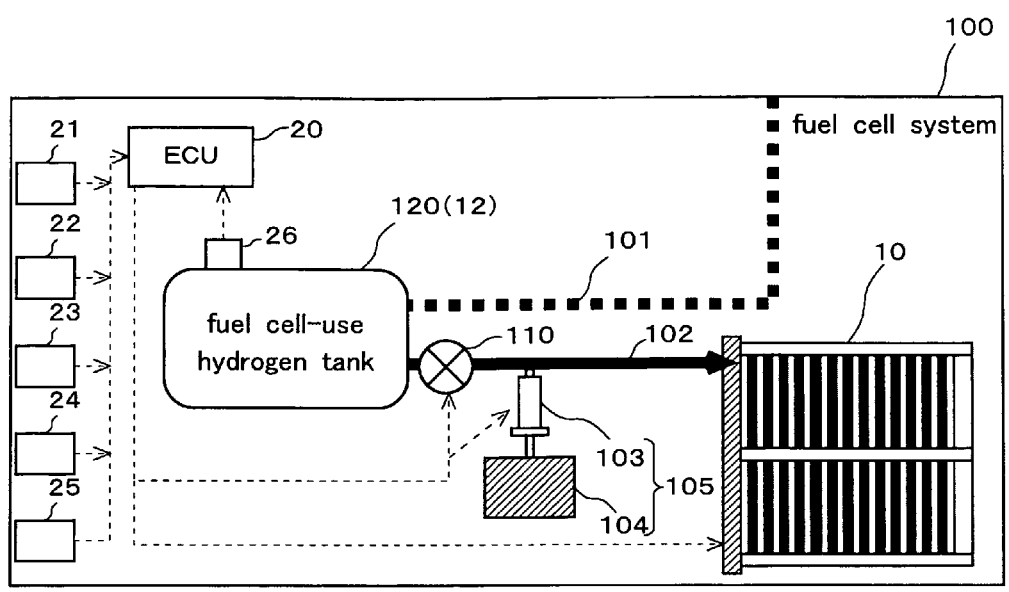
FIG. 2 is a first illustration showing a schematic configuration of a fuel cell system to which an odorant addition device according to an embodiment of the present invention is applied.

Details of the fuel cell system 100 are now described based on FIG. 2. The fuel cell system 100 shown in FIG. 2 is in a state of providing hydrogen gas i.e. fuel gas to the fuel cell 10 in the vehicle 1. Therefore, the fuel cell system 100 is not receiving supply of hydrogen gas from outside, but is in a state of generating power by the fuel cell 10 by supplying hydrogen gas to the cell.

The fuel cell system 100 shown in FIG. 2 has a fuel cell-use hydrogen tank 120 that is used for temporal storage of hydrogen gas (hereinafter simply referred to as "hydrogen tank", and corresponds to the hydrogen storage device 12 shown in FIG. 1). The hydrogen tank 120 is a high pressure tank that is capable of storing hydrogen gas in a liquefied state. Additionally, a pressure sensor 26 that detects internal pressure is provided to the hydrogen tank 120. The pressure sensor 26 is capable of measuring remaining amount of hydrogen gas within the hydrogen tank 12 based on the pressure within the tank 120.

Additionally, a hydrogen supply channel 102 is connected from the hydrogen tank 120 to the fuel cell 10 and is used for supply of hydrogen gas. Note that an adjustment valve 110 for adjusting flow rate of hydrogen gas is provided to the hydrogen supply channel 102. Further, a hydrogen supply channel 101 is also provided to the hydrogen tank 120, through which hydrogen gas flows when the gas is supplied as fuel from outside the fuel cell system 100. The hydrogen supply channel 101 is indicated with a dotted line in FIG. 2, since it is not used in the present embodiment.

An odorant addition device 105, which is used to add odorant to hydrogen gas flowing through the hydrogen supply channel 102, is also provided to this fuel cell system 100. This is to enable a person around the vehicle 1 to detect leakage of hydrogen gas in the event that hydrogen gas consumed by the fuel cell 10 leaked out of the cell. The odorant addition device 105 is composed of: an odorant tank 104 for storing odorant to be added; and an addition valve 103 for adding odorant.

In the fuel cell system 100 thus configured, the ECU 20, which is connected with the various sensors 21 through 25 described above, is also electrically connected to the adjustment valve 110 and the addition valve 103. In this way, addition of odorant is controlled by the odorant addition device 105 at the time when hydrogen gas is supplied from the hydrogen tank 120 to the fuel cell 10 during generation of power by the fuel cell 10.

<Odorant Addition Control 1>

Figure 3:
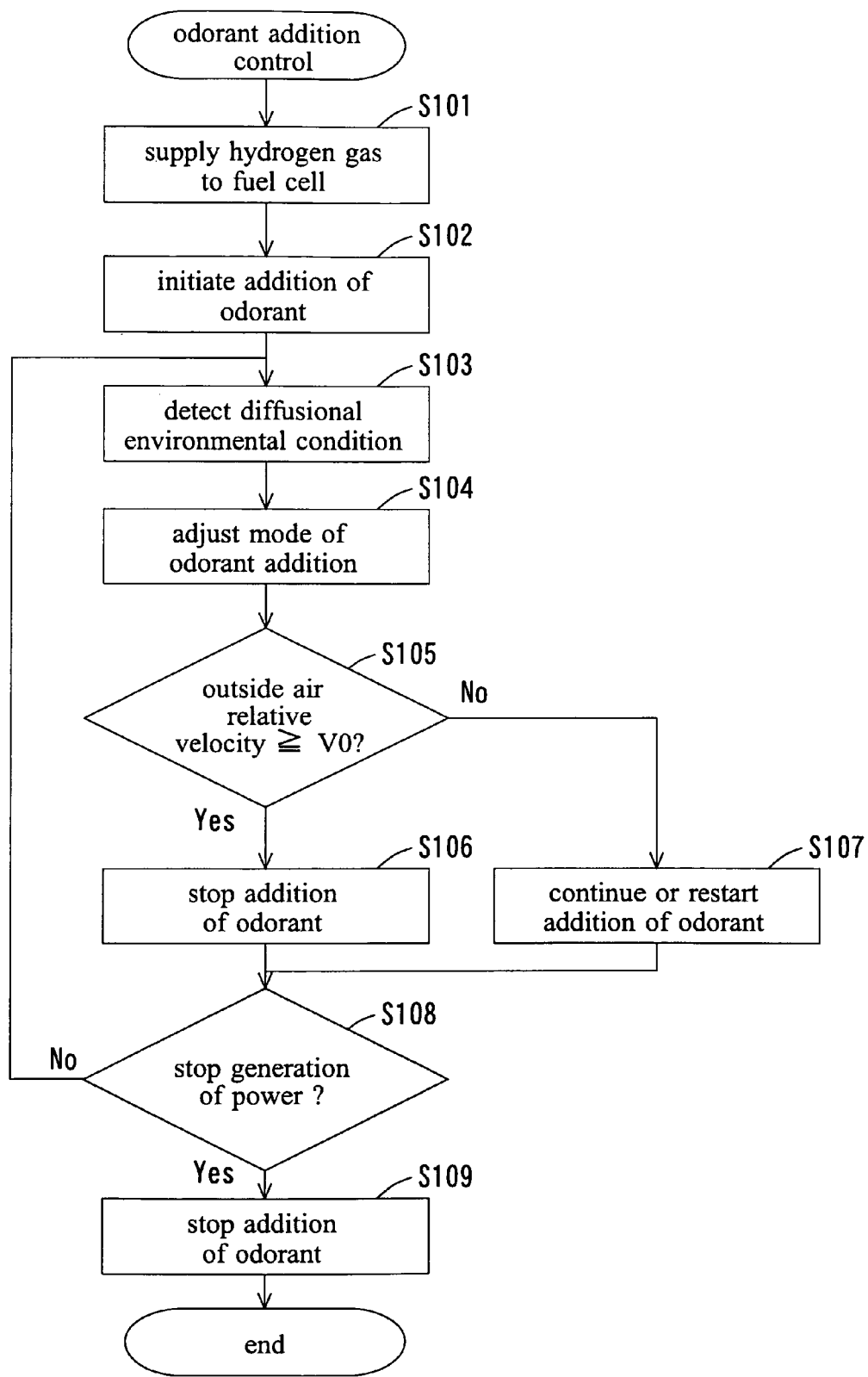
FIG. 3 is a flowchart showing an odorant addition control for adding odorant to hydrogen gas, that is performed in the fuel cell system shown in FIG. 2.

This odorant addition control is now described based on FIG. 3. Note that the odorant addition control in the present embodiment is a routine to be executed by the ECU 20. Initially, in S101, an amount of hydrogen gas necessary for generation of power by the fuel cell 10 is supplied from the hydrogen tank 120. Specifically, opening of the adjustment valve 110 is controlled by the ECU 20 such that an amount of hydrogen gas that corresponds to an amount of power to be output by the fuel cell 10 in response to an operational request from a driver of the vehicle 1 is supplied. Once the operation of S101 is complete, the routine proceeds to S102.

In S102, the addition valve 103 is controlled by the ECU 20 in order for the odorant addition device 105 to add odorant to hydrogen gas flowing through the hydrogen supply channel 102. Specifically, an amount of odorant that is proportional to the amount of hydrogen flowing through the hydrogen supply channel 102 estimated from the opening of the adjustment valve 110 is added. The amount of odorant to be added is calculated by the following Formula 1.

Amount to be Added $Aq$=Flow Rate of Hydrogen $FL$*Constant $K$ ($K$ is a fixed value)  (Formula 1)

Once the operation of S102 is complete, the routine proceeds to S103.

In S103, detection of diffusional environmental condition is performed in the fuel cell system 100. The diffusional environmental condition refers to an environmental condition that influences state of diffusion of hydrogen gas in outside air at the time when hydrogen gas consumed by the fuel cell 10 leaked out of the device for some reason. Different diffusional environmental conditions cause odorant to act differently on olfactory sense of an outside person at the time of hydrogen gas leakage. Therefore, if state of odorant added to hydrogen gas always remains constant, there may be cases such as a person is unable to detect leakage of hydrogen gas, or discomfort is brought to a person due to effect of odorant being excessively strong, or the like. The diffusional environmental condition is thus detected in S103, in order to make addition of odorant to hydrogen gas more appropriate.

In the present control, detection values of the various sensors 21 through 25 are employed in the detection of diffusional environmental condition. Detection by each sensor is described below from the viewpoint of diffusional environmental condition. As for the hygrothermal sensor 21, temperature and humidity of outside air detected by the sensor may influence state of diffusion of odorant in hydrogen gas leaked into outside air. For example, the lower the outside air temperature or the lower the outside air humidity, the less the odorant tends to diffuse into outside air, and thus the less easy it becomes for a person to detect leakage of hydrogen gas. The temperature and humidity of outside air are thus detected as the diffusional environmental condition.

As for the GPS sensor 22, the sensor detects geographical information of the vehicle 1. Some geographical condition of the vehicle 1 may influence state of diffusion of odorant in hydrogen gas leaked outside. The geographical condition may be an area always windy, a land with low temperatures, or the like, for example, and such an environmental condition may influence state of diffusion of odorant. Since diffusional condition can be detected indirectly from the geographical condition, the detection value of the GPS sensor 22 is adopted as the diffusional environmental condition.

As for the atmospheric pressure sensor 23, atmospheric pressure detected by the sensor influences state of diffusion of odorant in hydrogen gas leaked into outside air. For example, the lower the atmospheric pressure, the less the odorant tends to diffuse into outside air, and thus the less easy it becomes for a person to detect leakage of hydrogen gas. The atmospheric pressure is thus detected as the diffusional environmental condition.

As for the gas component sensor 24, the sensor detects gas component in outside air around the vehicle 1, especially gas component that acts on olfactory sense of human. Since odorant acts less on olfactory sense of human in an area with strong odor to some extent, a hot spring area for example, in such case it may be necessary that odorant diffuse more efficiently. The detection value by the gas component sensor 24 is thus adopted as the diffusional environmental condition.

As for the wind velocity sensor 25, the sensor detects velocity of outside air flowing around the vehicle 1, that is, wind velocity. Since wind velocity occurs relatively between outside air and the vehicle 1, it is detected not only when the vehicle 1 is in move but also when the vehicle 1 is stopped. Since odorant diffuses along with the flow of wind once hydrogen gas leaked into the outside air, the stronger the wind velocity, the more wide and dilute the odorant diffuses, and thus the less easy it becomes for a person to detect leakage of hydrogen gas. The wind velocity is thus detected as the diffusional environmental condition.

Those described above are the diffusional environmental conditions that may be adopted in the present control. However, any other environmental condition may also be adopted as the diffusional environmental condition as long as it influences state of diffusion of odorant. Once the operation of S103 is complete, the routine proceeds to S104.

In S104, mode of odorant addition by the odorant addition device 105 is adjusted based on the diffusional environmental condition detected in S103. The adjustment of mode of odorant addition is performed by adjusting the amount of odorant to be added from the addition valve as determined by the afore-mentioned Formula 1. Specifically, the following odorant addition coefficient is calculated based on the detection values of the various sensors 21 through 25, and the afore-mentioned Formula 1 is corrected to give the following Formula 2.

$$Aq = FL * K * \text{Odorant Addition coefficient} \quad \text{(Formula 2)}$$

Figure 4A:
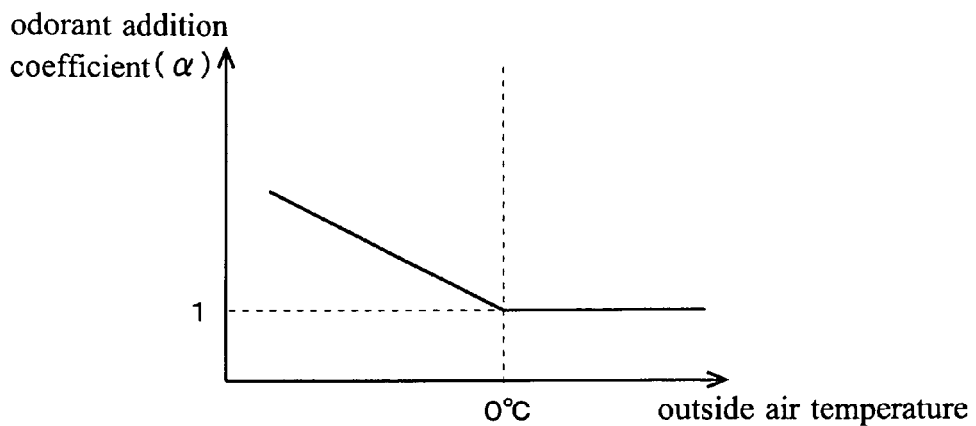
FIG. 4A is a graph showing a correlation between odorant addition coefficient α used for adjustment of mode of odorant addition executed by the odorant addition control shown in FIG. 3 and outside air temperature of the fuel cell system.

Calculation of the odorant addition coefficient is now described based on each illustration shown in FIG. 4A through 4E. FIG. 4A is an illustration showing a relationship between outside air temperature and odorant addition coefficient $\alpha$. According to this correlation, the odorant addition coefficient $\alpha$ is calculated based on the outside air temperature detected by the hygrothermal sensor 21. In the present control, the odorant addition coefficient $\alpha$ is 1 if the outside air temperature is higher than or equal to 0 degrees Celsius, and grows larger as the temperature degreases to less than 0 degrees Celsius. This is based on consideration that the lower the outside air temperature becomes, the lower the diffusion rate of odorant becomes, and thus the less the odorant acts on olfactory sense of human.

Figure 4B:
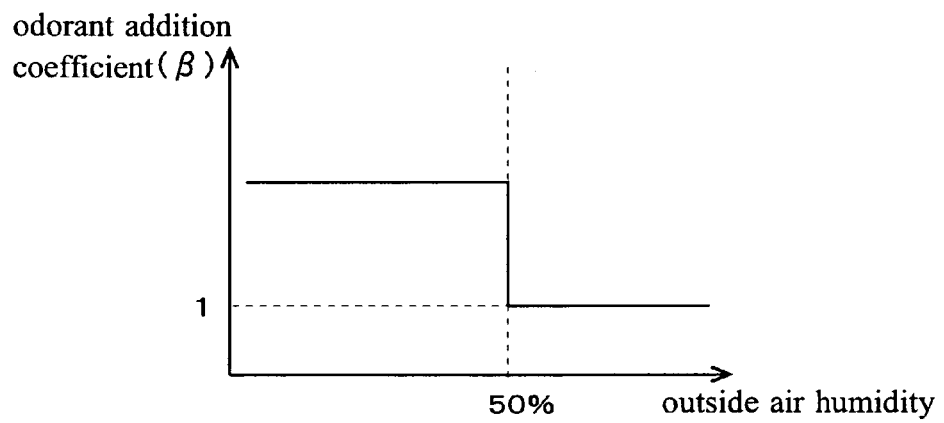
FIG. 4B is a graph showing a correlation between odorant addition coefficient β used for adjustment of mode of odorant addition executed by the odorant addition control shown in FIG. 3 and outside air humidity of the fuel cell system.
Figure 4C:
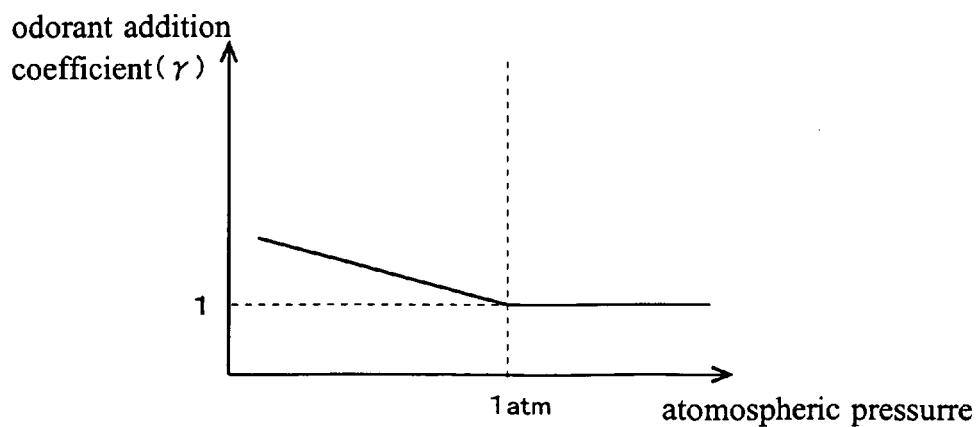
FIG. 4C is a graph showing a correlation between odorant addition coefficient γ used for adjustment of mode of odorant addition executed by the odorant addition control shown in FIG. 3 and atmospheric pressure of outside air.
Figure 4D:
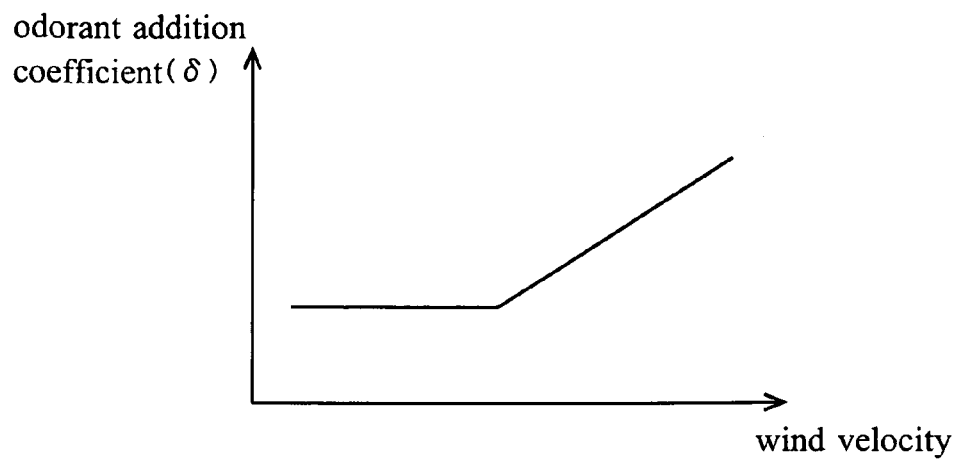
FIG. 4D is a graph showing a correlation between odorant addition coefficient δ used for adjustment of mode of odorant addition executed by the odorant addition control shown in FIG. 3 and outside air wind velocity of the fuel cell system.
Figure 4E:
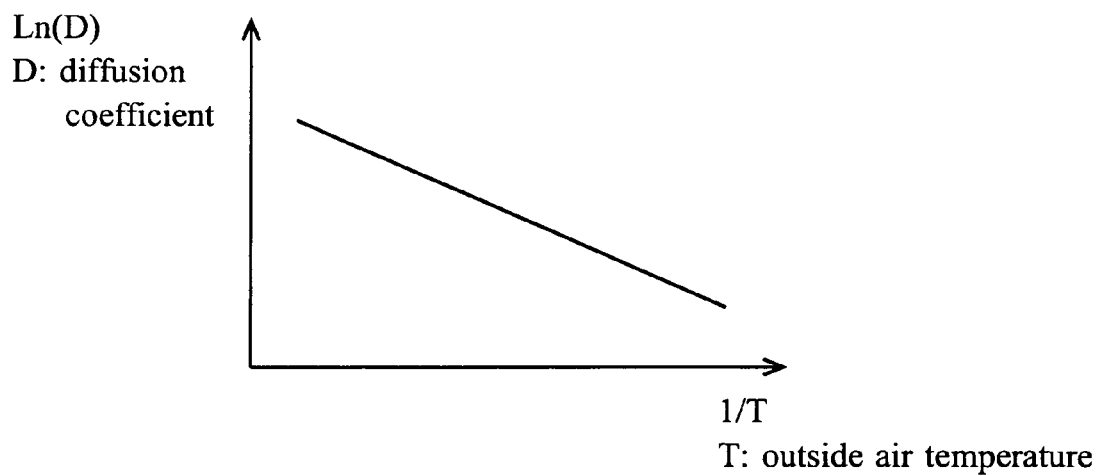
FIG. 4E is a graph showing a correlation between outside air temperature of the fuel cell system and diffusion coefficient indicating state of diffusion of odorant, that is considered in calculation of odorant addition coefficient α used for adjustment of mode of odorant addition executed by the odorant addition control shown in FIG. 3.

The relationship between outside air temperature and diffusion of odorant is now described in more detail based on FIG. 4E and the following Formula 3.

$$J = -D * dc/dy \quad \text{[Mathematical Formula 1]}$$

J: Diffusion Rate
D: Diffusion Coefficient
dc/dy: Concentration Gradient

That is, diffusion rate of odorant can be represented as a product of diffusion coefficient D and concentration gradient of odorant within outside air, while logarithm of the diffusion coefficient D has a linear correlation with respect to inverse of the outside air temperature, as shown in FIG. 4E. Therefore, in order to compensate for decrease in diffusion rate due to decrease in outside air temperature, the amount of odorant to be added from the addition valve 103 may be adjusted so as to increase concentration gradient of odorant, and on that basis, the odorant addition coefficient $\alpha$ shown in FIG. 4A can be calculated.

FIG. 4B is an illustration showing a relationship between outside air humidity and odorant addition coefficient $\beta$. According to this correlation, the odorant addition coefficient $\beta$ is calculated based on the outside air humidity detected by the hygrothermal sensor 21. In the present control, the odorant addition coefficient $\beta$ is 1 if the outside air humidity is greater than or equal to 50 percent, and becomes a steady-state value larger than 1 as the outside air humidity degreases to less than 50 percent. This is based on consideration that the lower the outside air humidity becomes, the less the odorant acts on olfactory sense of human.

FIG. 4C is an illustration showing a relationship between atmospheric pressure and odorant addition coefficient $\gamma$. According to this correlation, the odorant addition coefficient $\gamma$ is calculated based on the atmospheric pressure detected by the atmospheric pressure sensor 23. In the present control, the odorant addition coefficient $\gamma$ is 1 if the atmospheric pressure is greater than or equal to 1 atmospheric pressure, and grows larger as the atmospheric pressure decreases to less than 1 atmospheric pressure. This is based on consideration that the lower the atmospheric pressure becomes, the less the odorant acts on olfactory sense of human.

FIG. 4D is an illustration showing a relationship between wind velocity and odorant addition coefficient $\delta$. According to this correlation, the odorant addition coefficient $\delta$ is calculated based on the wind velocity detected by the wind velocity sensor 25. In the present control, the odorant addition coefficient $\delta$ is 1 if the wind velocity is less than or equal to 5 m/s, and grows larger as the wind velocity increases to over 5 m/s. This is based on consideration that the larger the wind velocity grows, the more quickly the odorant is diluted, and thus the less the odorant acts on olfactory sense of human.

The odorant addition coefficient may also be set based on the detection value of the gas component sensor 24. For example, if a presence of strong-odor gas is detected around the vehicle 1 by the gas component sensor 24, the odorant addition coefficient may be set to a larger value such that concentration of odorant in hydrogen gas becomes higher, in order not to cause odorant to act less on olfactory sense of human. To the contrary, if no strong-odor gas is detected around the vehicle 1 by the gas component sensor 24, the odorant addition coefficient may be set to a smaller value such that concentration of odorant in hydrogen gas becomes lower.

In addition, if the geographical condition of the vehicle 1 detected by the GPS sensor 22 is such a condition that the temperature, humidity, wind velocity, and the like as described above remarkably influence diffusion of odorant, another odorant addition coefficient may be set as an alternative to the odorant addition coefficient described above according to the geographical condition. For example, if the geographical condition of the vehicle 1 is a place always windy, then the odorant addition coefficient may be set according to such geographical condition, instead of calculating the odorant addition coefficient $\delta$ based on the detection value of the wind velocity sensor 25. Also, if the geographical condition of the vehicle 1 is a hot spring area with relatively strong odor, then the odorant addition coefficient may be set according to such geographical condition, instead of calculating the odorant addition coefficient based on the detection value of the gas component sensor 24. This allows some of the various sensors to be omitted.

The amount of odorant to be added by the odorant addition device 105 can be adjusted by substituting the odorant addition coefficient set as above into Formula 2. Note that if a plurality of odorant addition coefficients are employed, a product of the respective odorant addition coefficients is substituted into Formula 2. Although a plurality of odorant addition coefficients have been described hereinabove, not all of the odorant addition coefficients are necessarily required, but any one or more of the odorant addition coefficients may be used appropriately as required. In this way, the amount of odorant to be added by the odorant addition device 105 can be adjusted to an amount suitable to the state of diffusion of odorant, so that even if hydrogen gas leaked outside, the leakage thereof can be detected immediately. Once the operation of S104 is complete, the routine proceeds to S105.

In S105, a judgment is made on whether or not the outside air relative velocity of the vehicle 1 detected by the wind velocity sensor 25 is greater than or equal to a predetermined velocity V0. As described above based on FIG. 4D, by adjusting the odorant addition coefficient according to the wind velocity, detection of leakage based on odorant can be made more reliable. However, an excessively large wind velocity may result in a pronounced diffusion of odorant, which makes it difficult to detect leakage of hydrogen gas even if the hydrogen gas has odorant added thereto, thus resulting in waste of odorant.

Therefore, the threshold value that corresponds to such an excessively large wind velocity is set to V0, and then a judgment is made on whether or not the wind velocity relative to the vehicle 1 of this moment is greater than or equal to this predetermined velocity V0. If it is judged that the wind velocity is greater than or equal to the predetermined velocity V0 in S105, then the routine proceeds to S106, where addition of odorant by the odorant addition device 105 is stopped. In this way, addition of odorant is stopped under such a diffusional environmental condition that no effect of odorant can be expected, so that waste of odorant can be prevented. On the other hand, if it is judged that the wind velocity is not greater than or equal to the predetermined velocity V0, then the routine proceeds to S107, where addition of odorant by the odorant addition device 105 is continued or if addition of odorant was stopped previously by the operation of S106, then addition of odorant is restarted. Once the operation of S107 is complete, the routine proceeds to S108.

In S108, a judgment is made on whether or not generation of power by the fuel cell 10 is stopped. That is, a judgment is made on whether or not hydrogen gas needs to be supplied to the fuel cell 10. If it is judged that generation of power is stopped, then the routine proceeds to S109, where addition of odorant by the odorant addition device 105 is stopped. On the other hand, if it is judged that generation of power is not stopped, then the operations from S103 and later are repeated again.

According to the present control, in the fuel cell system 100 shown in FIG. 2, by adjusting amount of odorant in hydrogen gas based on the diffusional environmental condition, detection of hydrogen leakage in the event of the leakage can be made more reliable.

Embodiment 2

Figure 5:
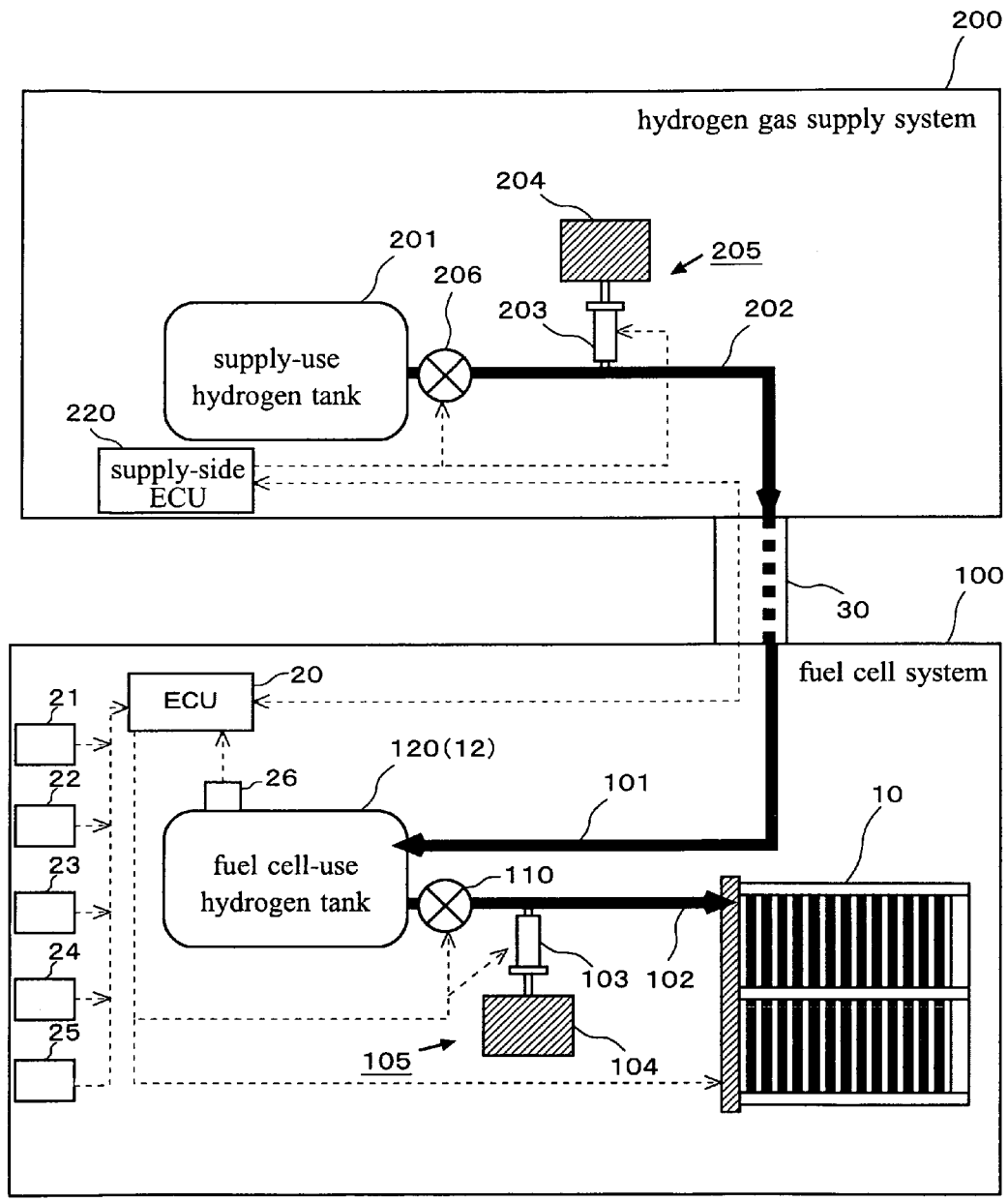
FIG. 5 is a second illustration showing a schematic configuration of a fuel cell system and a hydrogen gas supply system, to which an odorant addition device according to an embodiment of the present invention is applied.

A second embodiment of odorant addition device according to the present invention will now be described. FIG. 5 is a schematic illustration showing a fuel cell system 100, to which an odorant addition device according to the present embodiment is applied, and a hydrogen gas supply system 200, which supplies hydrogen gas as fuel gas to the fuel cell system, that are in a connected state. As for the fuel cell system 100, since it has a configuration identical to that of the fuel cell system 100 shown in FIG. 2, the same reference numbers are used and the configuration is not described in detail. Although the hydrogen supply channel 101 is indicated with a dotted line in FIG. 2, it is indicated with a solid line in FIG. 5.

The hydrogen gas supply system 200 has a supply-use hydrogen tank 201 for storing hydrogen gas to be supplied to a gas system. The supply-use hydrogen tank 201 is a high pressure tank, as with the hydrogen tank 120. A hydrogen supply channel 202, through which hydrogen gas to be supplied flows, is connected to the supply-use hydrogen tank 201. The channel can be coupled with a hydrogen supply channel 101 on the fuel cell system 100's side via a connecting channel 30.

Furthermore, an adjustment valve 206 for adjusting flow rate of hydrogen gas flowing therethrough and an odorant addition device 205 for adding odorant of the hydrogen gas are also provided on this hydrogen supply channel 202. As with the previous odorant addition device 105, this odorant addition device 205 is for adding odorant to hydrogen gas for detection of hydrogen gas leakage, and is composed of an odorant tank 204 for storing odorant to be added and an addition valve 203 for adding odorant. In the hydrogen gas supply system 200 thus configured, a supply-side ECU 220 is electrically connected to the adjustment valve 206 and the addition valve 203. In this way, addition of odorant to hydrogen gas is controlled by the odorant addition device 205 at the time when hydrogen gas is supplied from the hydrogen gas supply system 200 to the fuel cell system 100. Further, when the fuel cell system 100 and the hydrogen gas supply system 200 are connected via the connecting channel 30, the ECU 20 and the supply-side ECU 220 are electrically connected and are allowed to notify each other of a state of its own system.

As above, when the fuel cell system 100 and the hydrogen gas supply system 200 are connected via the connecting channel 30 and hydrogen gas is being supplied to the fuel cell system 100, the odorant addition device 205 can execute addition of odorant with respect to the fuel gas that is being supplied, so that the hydrogen gas with odorant added can be stored within the hydrogen tank 120. The hydrogen gas with odorant added is then supplied from the hydrogen tank 120 to the fuel cell 10, so that generation of power can be executed.

<Odorant Addition Control 2>

Figure 6:
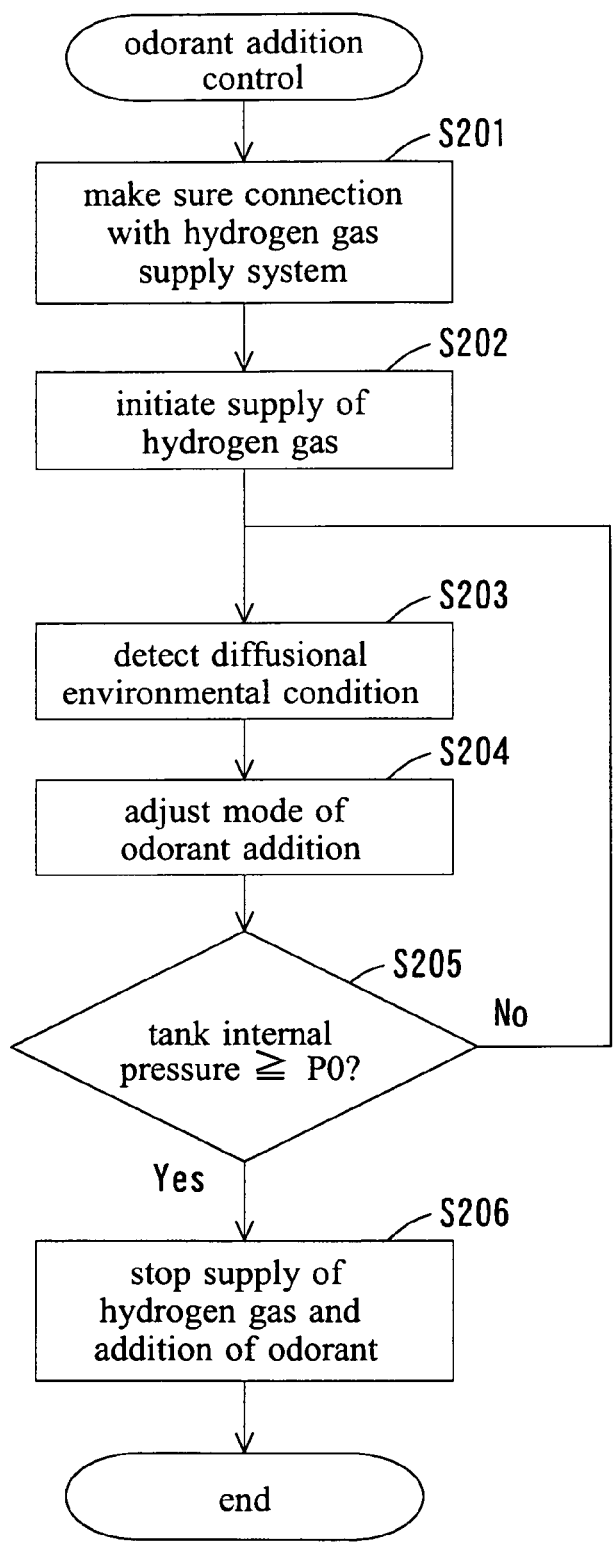
FIG. 6 is a first flowchart showing an odorant addition control for adding odorant to hydrogen gas, that is performed in both systems shown in FIG. 5.

The odorant addition control by the odorant addition device 205 is now described based on FIG. 6. Note that the odorant addition control in the present embodiment is a routine to be executed by the ECU 20 and the ECU 220. In S201, it is checked whether or not the fuel cell system 100 and the hydrogen gas supply system 200 are in a connected state. As shown in FIG. 5, the connection is made sure by assuring that the ECU 20 on the fuel cell system 100's side and the supply-side ECU 220 on the hydrogen gas supply system 200's side are in communication. Once the operation of S201 is complete, the routine proceeds to S202.

In S202, supply of hydrogen gas from the hydrogen gas supply system 200 to the fuel cell system 100 is initiated. Specifically, the supply of hydrogen gas is performed by opening the adjustment valve 206 in response to an instruction from the supply-side ECU 220. Along with the initiation of supply of hydrogen gas, addition of odorant by the odorant addition device 205 is also initiated. Once the operation of S202 is complete, the routine proceeds to S203.

In S203, detection of diffusional environmental condition is performed, as with S103 described above. Specifically, results of detections made by various sensors 21 through 25 are passed to the supply-side ECU 220 via the ECU 20. Once the operation of S203 is complete, the routine proceeds to S204.

In S204, mode of odorant addition by the odorant addition device 205 is adjusted based on the diffusional environmental condition detected in S203, as with S104 described above. Therefore, mode of odorant addition is adjusted according to outside air temperature, outside air humidity, and the like of the time when the fuel cell system 100 mounted on the vehicle 1 receives supply of hydrogen gas. Once the operation of S204 is complete, the routine proceeds to S205.

In S205, a judgment is made on whether or not tank internal pressure within the hydrogen tank 120 detected by a pressure sensor 26 is greater than or equal to a predetermined pressure P0. This predetermined pressure P0 is a tank internal pressure that is obtained when a sufficient amount of hydrogen gas has been supplied into the hydrogen tank 120. If it is judged that the tank internal pressure is greater than or equal to the predetermined pressure P0 in S205, then the routine proceeds to S206, where supply of hydrogen gas from the hydrogen gas supply system 200 and addition of odorant by the odorant addition device 205 are stopped. On the other hand, if it is judged that the tank internal pressure is not greater than or equal to the predetermined pressure P0 in S205, then the operations from S203 and later are performed again.

According to the present control, addition of odorant is performed at the time when hydrogen gas is supplied to the fuel cell system 100, in the optimal mode based on the diffusional environmental condition that can be taken into consideration at that time of the supply. Therefore, detection of hydrogen gas leakage based on odorant can be performed more reliably even at the time when the hydrogen gas is being consumed by the fuel cell 10. Although the various sensors 21 through 25 provided on the fuel cell system 100's side are employed for the detection of diffusional environmental condition in the present embodiment, a dedicated sensor(s) may also be provided on the hydrogen gas supply system 200's side and the detection of diffusional environmental condition may be performed according to detection value(s) of the sensor(s).

Further, since adjustment of mode of odorant addition by the present control is performed at the time of the hydrogen gas supply, there may be some deviation in the diffusional environmental condition between the time of the supply and the time when the hydrogen gas is consumed by the fuel cell 10. Therefore, in addition to the present control, another odorant addition control may also be performed redundantly by the odorant addition device 105 described in the embodiment 1. In this case, it is preferable that addition of odorant by the odorant addition device 105 is performed in consideration of odorant already added to the hydrogen gas by the odorant addition device 205.

<Odorant Addition Control 3>

Figure 7:
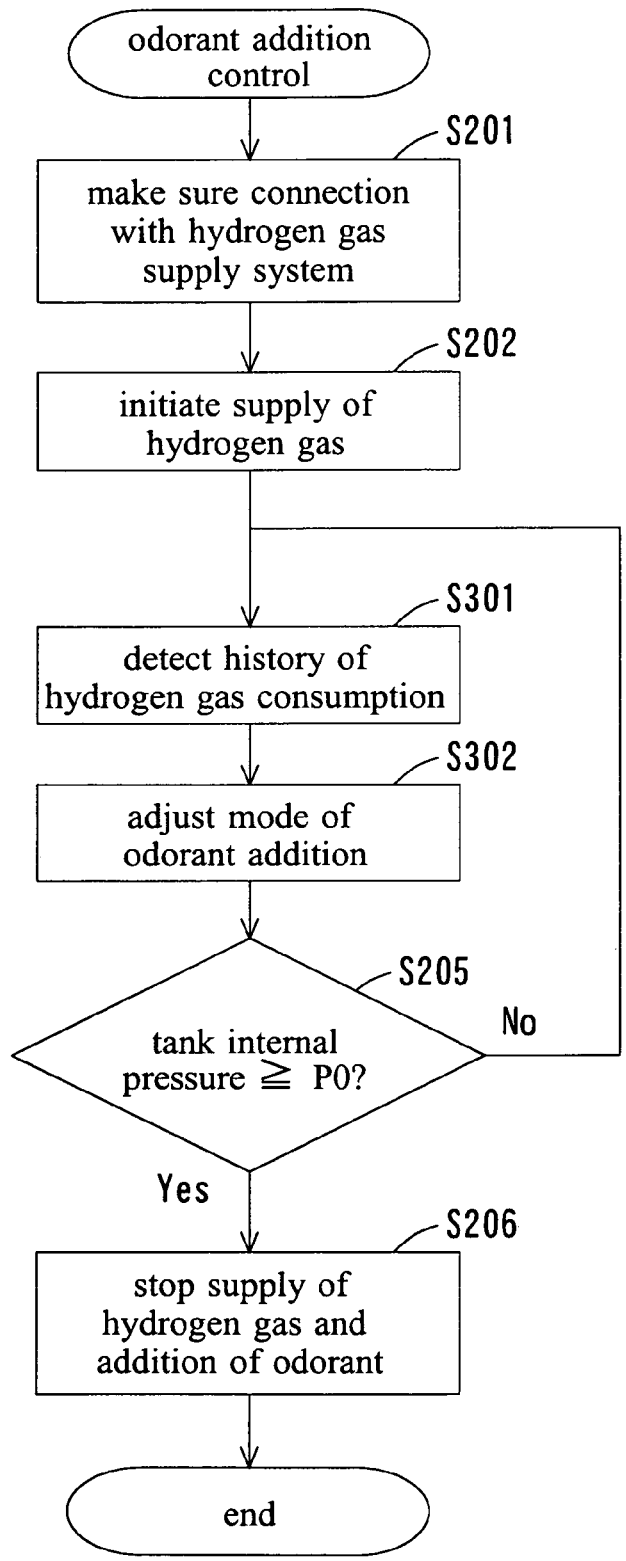
FIG. 7 is a second flowchart showing an odorant addition control for adding odorant to hydrogen gas, that is performed in both systems shown in FIG. 5.
Figure 8:
FIG. 8 is a graph showing a correlation between odorant addition coefficient ε used for adjustment of mode of odorant addition executed by the odorant addition control shown in FIG. 7 and running distance of a vehicle equipped with a fuel cell system.

Another embodiment of control regarding addition of odorant to be performed by the odorant addition device 205 applied to the hydrogen gas system 200 shown in FIG. 5 is now described based on FIG. 7 and FIG. 8. The odorant addition control in the present embodiment is a routine to be executed by the ECU 20 and the supply-side ECU 220, as with the odorant addition control described above. Note that among operations of the odorant addition control shown in FIG. 7, those identical with the operations of the odorant addition control shown in FIG. 6 and already described above have the same reference numbers, and thus are not described in detail.

In the present odorant addition control, the routine proceeds to S301 after the operation of S202. In S301, the supply-side ECU 220 detects a history of hydrogen gas consumption in the fuel cell system 100 that is in connection. This history of hydrogen gas consumption corresponds to an internal environmental condition of the fuel cell system (hereinafter referred to as "internal environmental condition"). The internal environmental condition differs from the diffusional environmental condition mentioned above, and is an environmental condition within the fuel cell system that relates to leakage of odorant contained in hydrogen gas to outside the fuel cell system, that is, an environmental condition of the fuel cell system that should be considered at the time of adding odorant to hydrogen gas. Here, it is conceived that the history of hydrogen gas consumption in the fuel cell system 100 relates to a level of facility-related deterioration of the fuel cell system 100, which in turn links to easiness of detecting leakage of hydrogen gas based on odorant. Therefore, in the present odorant addition control, the history of hydrogen gas consumption is adopted as the internal environmental condition. As for the term "history of hydrogen gas consumption" used herein, not only an amount of hydrogen gas consumed by the fuel cell system 100 but also other parameter(s) associated with "history of hydrogen gas consumption" may be employed, such as a running distance and the like of the vehicle 1, for example. Once the operation of S301 is complete, the routine proceeds to S302.

In S302, mode of odorant addition by the odorant addition device 205 is adjusted based on the history of hydrogen gas consumption detected in S301. The adjustment of mode of odorant addition is performed by adjusting the odorant addition coefficient in Formula 2, as with S104 and S204 described above. Specifically, mode of odorant addition is adjusted based on a relationship between running distance of the vehicle 1 as the "history of hydrogen gas consumption" and odorant addition coefficient $\epsilon$, shown in FIG. 8. In the present embodiment, the odorant addition coefficient $\epsilon$ is set to 1 if the running distance of the vehicle 1 is less than or equal to 30000 kilometers, and is set to 0.5 if the running distance of the vehicle 1 is over 30000 kilometers. That is, it is deemed that detection of hydrogen gas leakage becomes easier once the amount of hydrogen gas consumed exceeds the running distance of 30000 kilometers, so that in such case, the odorant addition coefficient is made smaller, thereby preventing waste of odorant. Once the operation of S302 is complete, the operations from S205 and later are performed.

In the present odorant addition control, since mode of odorant addition to hydrogen gas is adjusted according to the internal environmental condition of the fuel cell system 100, it is possible to detect hydrogen gas leakage reliable while maintaining amount of odorant to be added in a suitable range.

<Odorant Addition Control 4>

Figure 9:
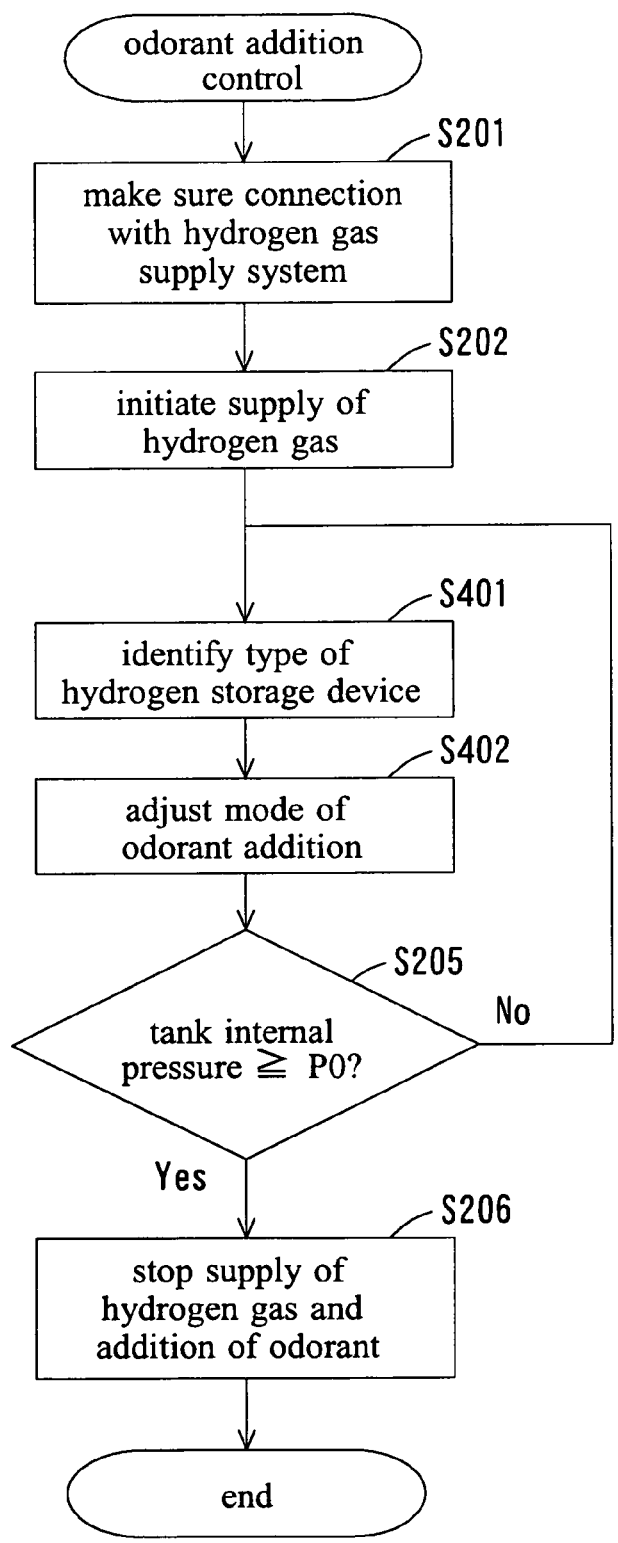
FIG. 9 is a third flowchart showing an odorant addition control for adding odorant to hydrogen gas, that is performed in both systems shown in FIG. 5.

Another embodiment of control regarding addition of odorant to be performed by the odorant addition device 205 applied to the hydrogen gas system 200 shown in FIG. 5 is now described based on FIG. 9. The odorant addition control in the present embodiment is a routine to be executed by the ECU 20 and the ECU 220, as with the odorant addition control described above. Note that among operations of the odorant addition control shown in FIG. 9, those identical with the operations of the odorant addition control shown in FIG. 6 and already described above have the same reference numbers, and thus are not described in detail.

In the present odorant addition control, the routine proceeds to S401 after the operation of S202. In S401, as the internal environmental condition described above, the type of the hydrogen storage device 12 mounted on the fuel cell system 100 is identified. In the present embodiment, the hydrogen storage device 12 is identified as either a high pressure tank or a MH tank that employs hydrogen occlusion alloy. Specifically, the supply-side ECU 220 makes an access to the ECU 20 and identifies the type of the hydrogen tank that corresponds to the hydrogen storage device recognized by the ECU 20 to be on the fuel cell system 100's side. A high pressure tank is capable of storing hydrogen gas in a liquefied form, and allows hydrogen gas in the tank to have odorant mixed in advance. On the other hand, a MH tank is capable of storing hydrogen gas more safely, but since it is not easy for hydrogen occlusion alloy to store odorant efficiently, it is not allowed to have odorant mixed in hydrogen gas prior to storing the gas into the tank. Therefore, in the present embodiment, the present odorant addition control is performed by recognizing the relationship between hydrogen storage device and odorant as the internal environmental condition. Once the operation of S401 is complete, the routine proceeds to S402.

In S402, mode of odorant addition is adjusted based on the type of the hydrogen storage device 12 identified in S401. Specifically, if the hydrogen storage device 12 is a hydrogen tank 120 of high pressure tank-type as shown is FIG. 5, then the odorant addition coefficient in Formula 2 is set to 1 and addition of odorant by the odorant addition device 205 is performed. On the other hand, if the hydrogen storage device 12 is a storage device of MH tank-type, then the odorant addition coefficient in Formula 2 is set to zero and addition of odorant by the odorant addition device 205 is not performed. In the latter case, addition of odorant to hydrogen gas is executed by the odorant addition device 105 described above.

According to the present odorant addition control, mode of odorant addition is adjusted based on the relationship between odorant and hydrogen storage device of fuel cell system, that is, the storage performance of hydrogen storage device. This allows addition of odorant to be performed in a more suitable state.

<Another Embodiment of Hydrogen Gas Supply System to which Odorant Addition Control 4 is Applied>

Figure 10:
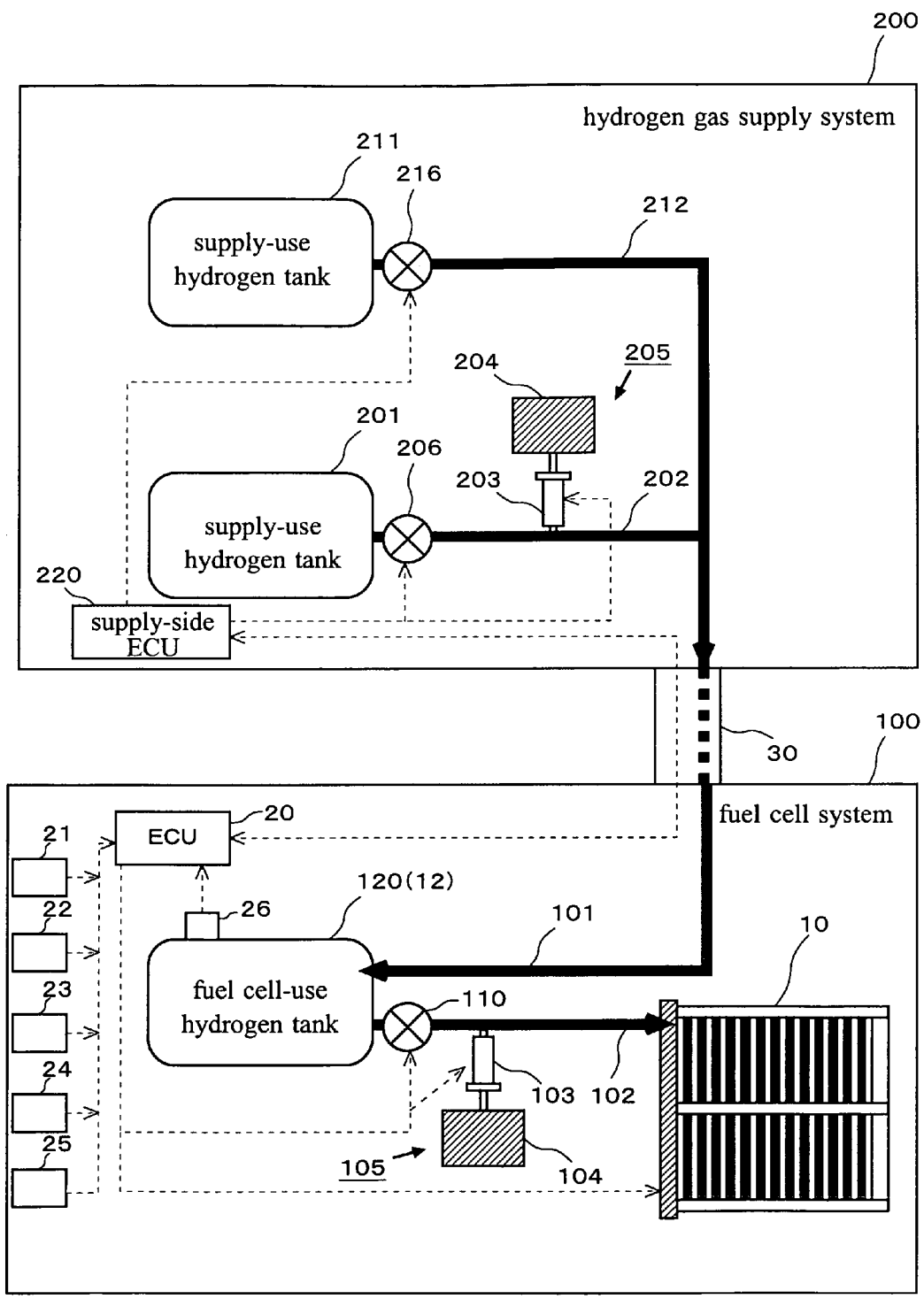
FIG. 10 is an illustration showing a schematic configuration of another fuel cell system and another hydrogen gas supply system, to which the odorant addition control shown in FIG. 9 is applicable.

Another embodiment of hydrogen gas supply system 200 to which the above-described odorant addition control shown in FIG. 9 is applicable is shown in FIG. 10. As with FIG. 5, FIG. 10 is an illustration showing a fuel cell system 100 and a hydrogen gas supply system 200 that are in a coupled state. FIG. 10 differs from FIG. 5 in its configuration within the hydrogen gas supply system 200. The remaining identical configurations have the same reference numbers and thus are not described in detail.

In addition to a supply-use hydrogen tank 201 for storing hydrogen gas to be supplied to the gas system, the hydrogen gas supply system 200 shown in FIG. 10 also has another supply-use hydrogen tank 211. This supply-use hydrogen tank 211 is a high pressure tank, as with the supply-use hydrogen tank 201. The supply-use hydrogen tank 211 is connected to a hydrogen supply channel 202 via a hydrogen supply channel 212. There is also an adjustment valve 216, which is for adjusting flow rate of hydrogen gas flowing therethrough, provided on the hydrogen supply channel 212, with opening thereof being controlled by a supply-side ECU 220. Note that no odorant addition device such as an odorant addition device 205 is provided to the hydrogen supply channel 212.

The hydrogen gas supply system thus configured can supply hydrogen gas stored in either one of the supply-use hydrogen tanks 201, 211 to the fuel cell system 100 in a selective manner according to an instruction from the supply-side ECU 220. The odorant addition device 205 adds odorant to hydrogen gas supplied from the supply-use hydrogen tank 201. This allows for selective supply of either hydrogen gas with odorant added or hydrogen gas with no odorant added, from the hydrogen gas supply system 200 to the fuel cell system 100.

In case where the odorant addition control shown in FIG. 9 is applied to the hydrogen gas supply system 200 shown in FIG. 10, the type of the hydrogen storage device mounted on the fuel cell system 100 is identified by the supply-side ECU 220, and based on the result of identification, a selection is made between supplying hydrogen gas from the supply-use hydrogen tank 201 i.e. supplying hydrogen gas with odorant added to the fuel cell system 100 or supplying hydrogen gas from the supply-use hydrogen tank 211 i.e. supplying hydrogen gas with no odorant added to the fuel cell system 100. In this way, the hydrogen gas supply system 200 and the fuel cell system 100 can fulfill the same effect as the odorant addition control shown in FIG. 9. Note that in case of supplying hydrogen gas from the supply-use hydrogen tank 211, odorant may be added by the odorant addition device 105 as need arises.

Embodiment 3

Figure 11:
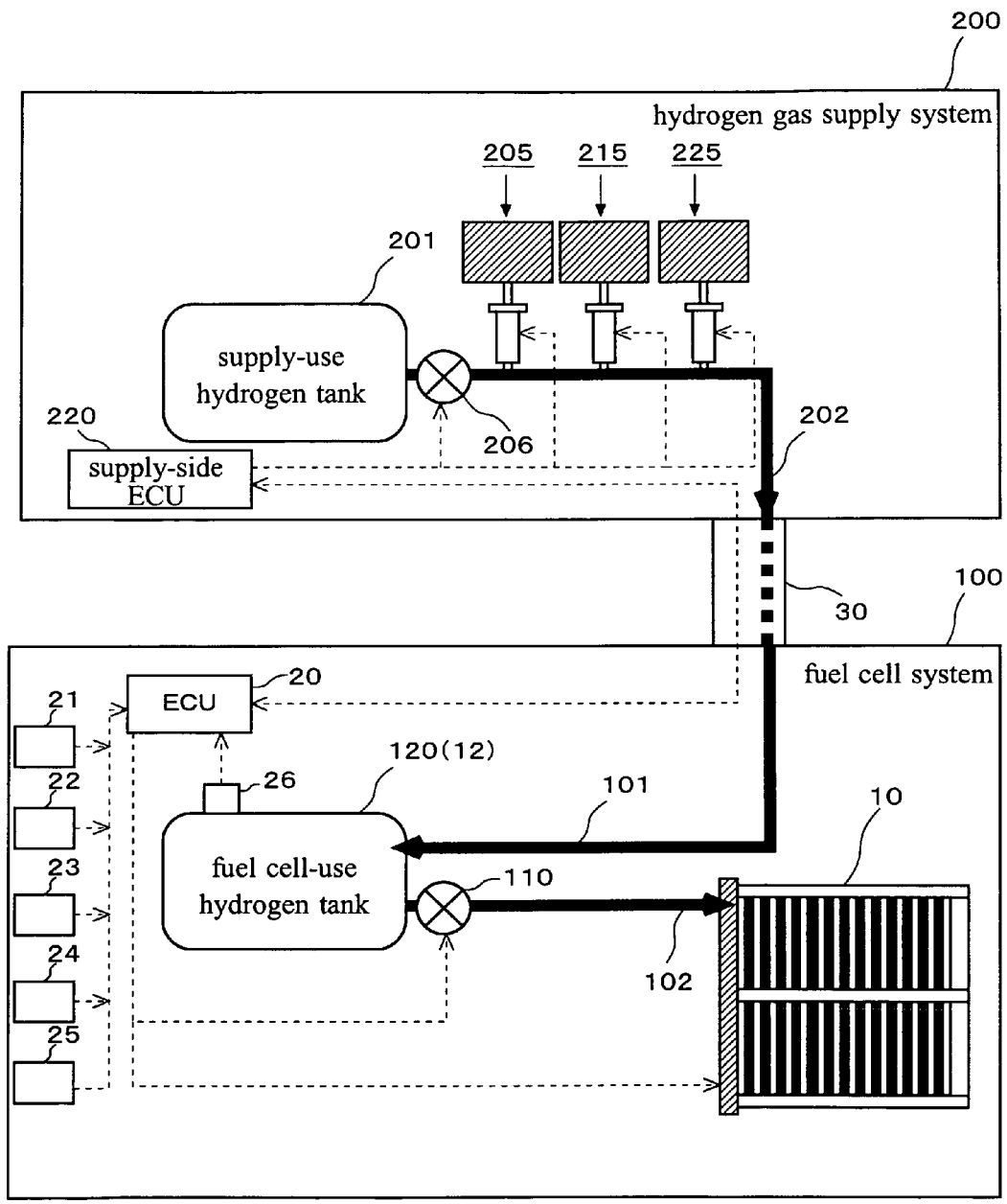
FIG. 11 is a third illustration showing a schematic configuration of a fuel cell system and a hydrogen gas supply system, to which an odorant addition device according to an embodiment of the present invention is applied.

A third embodiment of odorant addition device according to the present invention will now be described. FIG. 11 is a schematic illustration showing a fuel cell system 100, to which an odorant addition device according to the present embodiment is applied, and a hydrogen gas supply system 200, which supplies hydrogen gas as fuel gas to the fuel cell system, that are in a connected state. The state of both systems shown in FIG. 11 differs from the state of both systems shown in FIG. 5 in that no odorant addition device 105 is provided on the fuel cell system 100's side and that three odorant addition devices 205, 215, 225 are provided on the hydrogen gas supply system 200's side instead of one odorant addition device 205.

As for the three odorant addition devices 205, 215, 225, odorants to be added thereby have different components A, B, C, respectively, and each of the odorant addition devices adds its odorant to hydrogen gas flowing through a hydrogen supply channel 202 according to an instruction from a supply-side ECU 220. Therefore, it is possible to arbitrarily change mix ratio between the odorant components A, B, C in the hydrogen gas to be supplied from the hydrogen gas supply system 200 to the fuel cell system 100.

As above, when the fuel cell system 100 and the hydrogen gas supply system 200 are connected via a connecting channel 30 and hydrogen gas is being supplied to the fuel cell system 100, the odorant addition devices 205, 215, 225 can execute addition of mixture odorant composed of the three different components with respect to the fuel gas that is being supplied, so that the hydrogen gas with the odorant added can be stored within the hydrogen tank 120. The hydrogen gas with the odorant added is then supplied from the hydrogen tank 120 to the fuel cell 10, so that generation of power can be executed.

<Odorant Addition Control 5>

Figure 12:
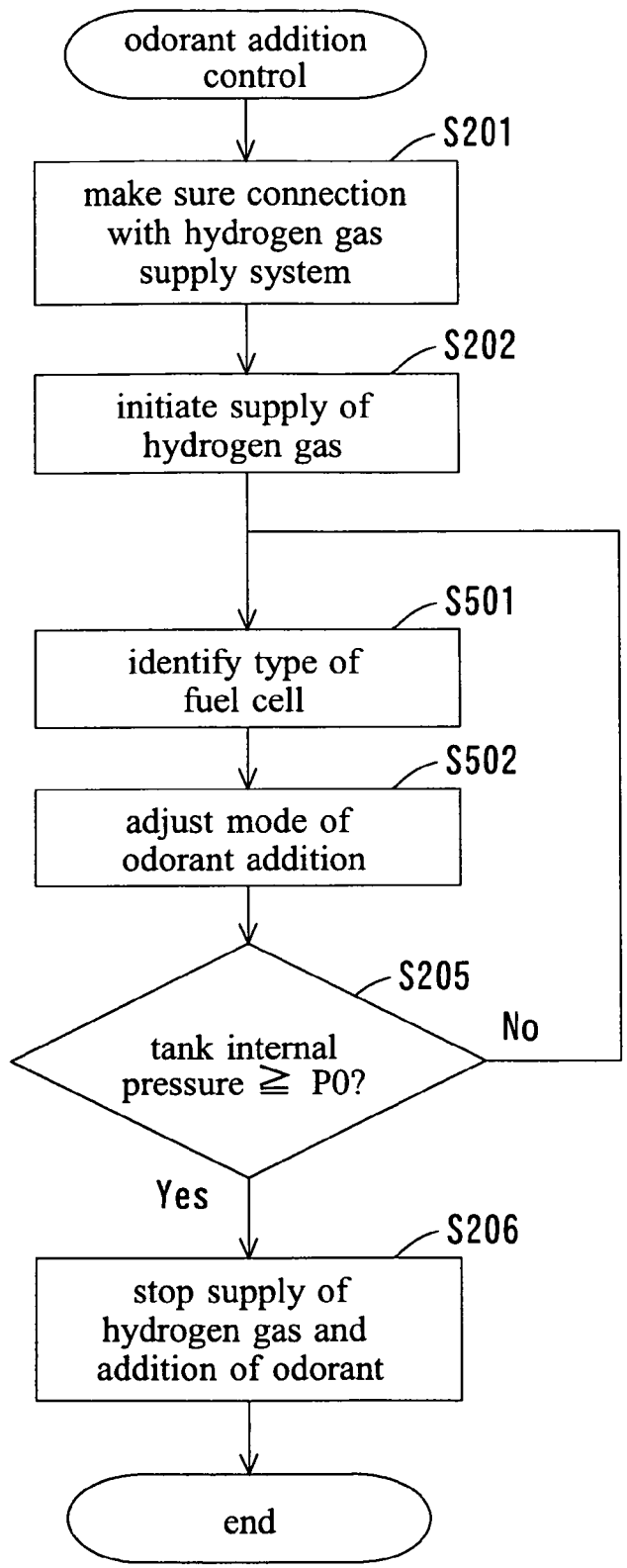
FIG. 12 is a flowchart showing an odorant addition control for adding odorant to hydrogen gas, that is performed in both systems shown in FIG. 11.

An odorant addition control to be performed in the hydrogen gas supply system 200 shown in FIG. 11 is described below based on FIG. 12. The odorant addition control in the present embodiment is a routine to be executed by the ECU 20 and the supply-side ECU 220, as with the odorant addition control described above. Note that among operations of the odorant addition control shown in FIG. 12, those identical with the operations of the odorant addition control shown in FIG. 6 and already described above have the same reference numbers, and thus are not described in detail.

In the present odorant addition control, the routine proceeds to S501 after the operation of S202. In S501, the supply-side ECU 220 makes an access to the ECU 20 and identifies the type of the fuel cell 10 that is mounted on the fuel cell system 100's side. For example, if the fuel cell 10 is a polymer electrolyte fuel cell, then durability of the fuel cell 10 against odorant contained in hydrogen gas may vary according to the type of electrolyte, catalyst, and the like used in the cell. That is, there are various possible types of fuel cells that receive supply of hydrogen gas from the hydrogen gas supply system 200, and durability against odorant may vary for each type of fuel cell. This point also needs to be considered sufficiently at the time of adding odorant to hydrogen gas. In the odorant addition control according to the present embodiment, therefore, the type of the fuel cell 10 is identified in S501 in order for mode of odorant addition to be in a state that is suitable to durability against odorant of the fuel cell in receipt of hydrogen gas. Once the operation of S501 is complete, the routine proceeds to S502.

In S502, mode of odorant addition by the odorant addition devices 205, 215, 225 is adjusted based on the type of the fuel cell 10 detected in S501, that is, based on the durability of the fuel cell against odorant. For example, supposing that the respective odorant components from the odorant addition devices 205, 215, 225 are mixed in a ratio of component A:component B:component C=6:3:1 and that this ratio is used as a standard mix ratio, the fuel cell 10 can be categorized into the following three types of fuel cells on the basis of this mixture odorant:

Case (1) the durability of the fuel cell 10 against the odorant mixed in the standard mix ratio (herein referred to as "standard mixture odorant") is relatively low;

Case (2) the durability of the fuel cell 10 against the standard mixture odorant is relatively high; and Case (3) the durability of the fuel cell 10 against one specific component C in the standard mixture odorant is extremely low.

If the fuel cell 10 is identified as a fuel cell that belongs to the Case (1) as a result of the operation in S501, then amount of odorant to be added from each odorant addition device is decreased while the afore-mentioned standard mix ratio is maintained, thereby lowering concentration of odorant in the hydrogen gas to 10 ppm, for example. If the fuel cell 10 is identified as a fuel cell that belongs to the Case (2), then amount of odorant to be added from each odorant addition device is increased while the afore-mentioned standard mix ratio is maintained, thereby raising concentration of odorant in the hydrogen gas to 20 ppm, for example. If the fuel cell 10 is identified as a fuel cell that belongs to the Case (3), then the afore-mentioned standard mix ratio is changed, and mode of odorant addition from each odorant addition device is adjusted such that ratio of the one specific component C becomes zero, for example, such that the respective odorant components from the odorant addition devices 205, 215, 225 are mixed in a ratio of component A:component B:component C=6:4:0. Once the operation of S502 is complete, the routine proceeds to S503.

According to the present control, addition of odorant to hydrogen gas can be performed in consideration of difference in the durability of the fuel cell 10 against odorant, so that a good balance can be achieved between longer operating life of the fuel cell 10 and reliable detection of hydrogen gas leakage.

Embodiment 4

Figure 13:
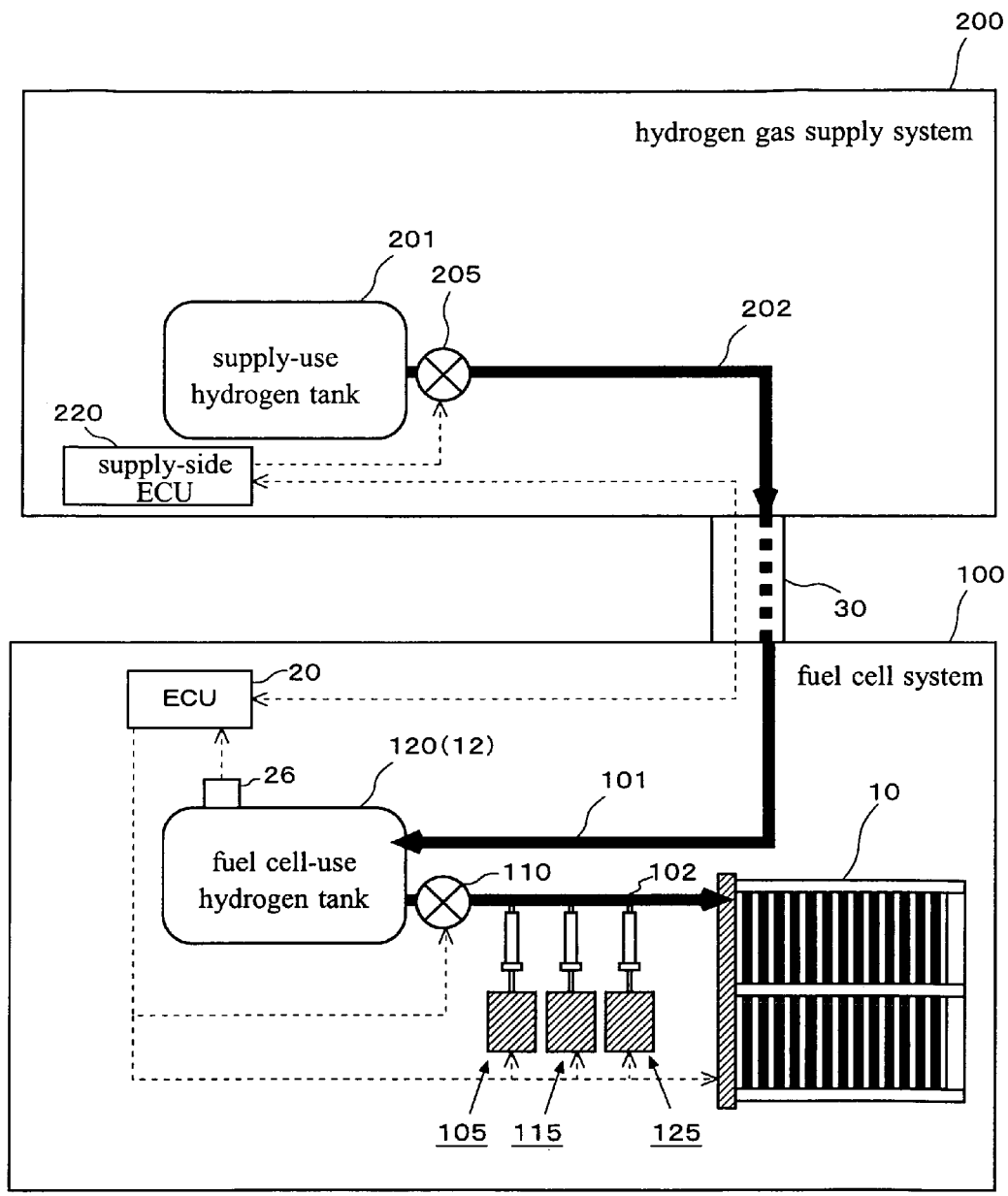
FIG. 13 is a fourth illustration showing a schematic configuration of a fuel cell system and a hydrogen gas supply system, to which an odorant addition device according to an embodiment of the present invention is applied.

A fourth embodiment of odorant addition device according to the present invention will now be described. FIG. 13 is a schematic illustration showing a fuel cell system 100, to which an odorant addition device according to the present embodiment is applied, and a hydrogen gas supply system 200, which supplies hydrogen gas as a fuel gas to the fuel cell system, that are in a connected state. The state of both systems shown in FIG. 13 differs from the state of both systems shown in FIG. 5 in that no odorant addition device 205 is provided on the hydrogen gas supply system 200's side and that three odorant addition devices 105, 115, 125 are provided on the fuel cell system 100's side instead of one odorant addition device 105. Further, there are no various sensors 21 through 25 provided on the fuel cell system 100's side.

Figure 14:
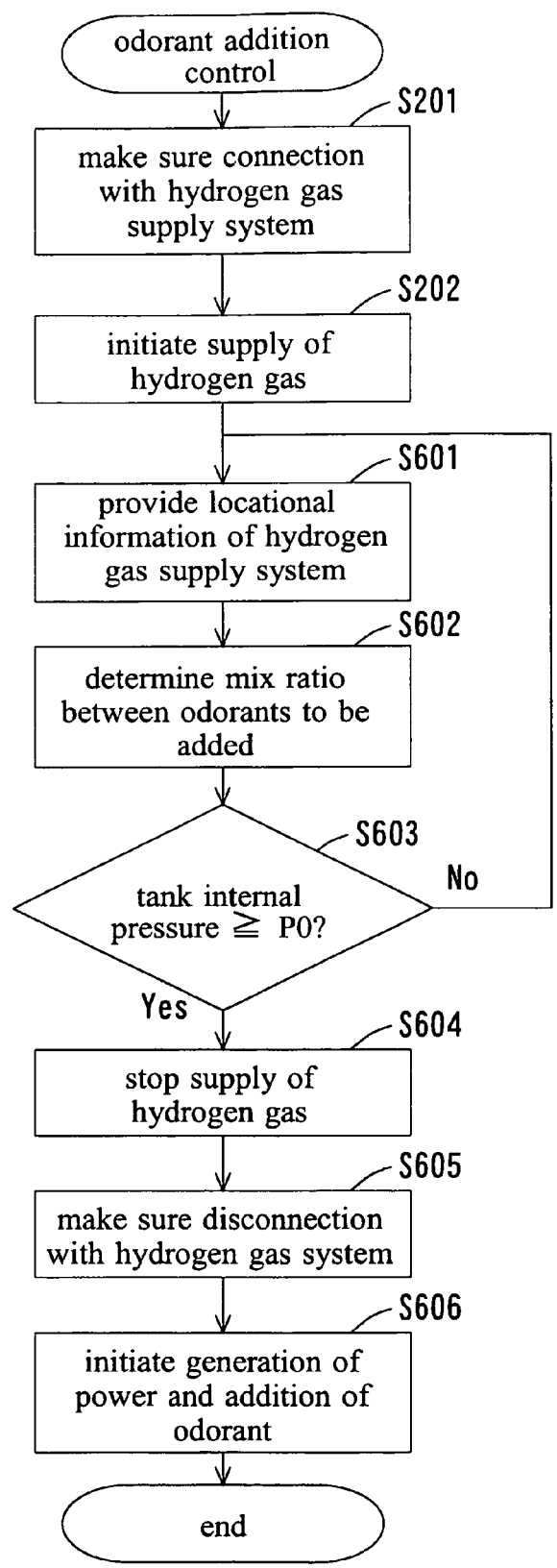
FIG. 14 is a flowchart showing an odorant addition control for adding odorant to hydrogen gas, that is performed in both systems shown in FIG. 13.

As for the three odorant addition devices 105, 115, 125, odorants to be added thereby have different components A, B, C, respectively, and each of the odorant addition devices adds its odorant to hydrogen gas flowing through a hydrogen supply channel 102 according to an instruction from an ECU 20. Therefore, it is possible to arbitrarily change mix ratio between the odorant components A, B, C in the hydrogen gas to be supplied from the hydrogen tank 120 to the fuel cell 10. Now, an odorant addition control regarding adjustment of mode of odorant addition to be performed on the fuel cell system 100's side when the fuel cell system 100 and the hydrogen gas supply system 200 are connected via a connecting channel 30 and hydrogen gas is being supplied to the fuel cell system 100, will be described based on FIG. 14.

<Odorant Addition Control 6>

The odorant addition control in the present embodiment is a routine to be executed by the ECU 20 and the supply-side ECU 220, as with the odorant addition control described above. Note that among operations of the odorant addition control shown in FIG. 14, those identical with the operations of the odorant addition control shown in FIG. 6 and already described above have the same reference numbers, and thus are not described in detail.

In the present odorant addition control, the routine proceeds to S601 after the operation of S202. In S601, locational information of where the hydrogen gas supply system 200 is installed is provided from the supply-side ECU 220 to the ECU 20 of the fuel cell system 100. This locational information is a geographical condition where the hydrogen gas supply system 200 is installed, but may also be used as an environmental condition that may be approximated as the geographical condition of a vehicle 1 that consumes hydrogen gas. Considering that this locational information is a piece of information that influences diffusion of odorant (although it is described in Embodiment 1, but the present embodiment differs from Embodiment 1 in that the geographical condition (diffusional environmental condition) on the hydrogen gas supply system's side is employed), odorant that is suitable to the extent possible can be added on the fuel cell system 100's side during consumption of hydrogen gas in the vehicle 1. Note that this locational information is a piece of information that is stored in advance in memory within the supply-side ECU 220. Once the operation of S601 is complete, the routine proceeds to S602.

In S602, mix ratio between the odorants mixed and added by the odorant addition devices 105, 115, 125 on the fuel cell system 100's side is determined based on the locational information provided in S601. For example, suppose that the vehicle 1 equipped with the fuel cell system 100 is running across a plurality of areas (such as countries, districts, and the like). If the locational information provided in S601 is a piece of information regarding an area (a), then the information is compared to information that the ECU 20 has regarding the area (a) (such as average temperature, outside air velocity, and the like), and in case of match, the mix ratio between odorants is set to a ratio of component A:component B:component C=6:3:1 and then is stored in memory within the ECU 20 as a mix ratio for the time of running in the area (a). If the locational information provided in S601 is a piece of information regarding an area (b), then the information is compared to information that the ECU 20 has regarding the area (b), and in case of match, the mix ratio between odorants is set to a ratio of component A:component B:component C=6:4:0 and then is stored in memory within the ECU 20 as a mix ratio for the time of running in the area (b). Once the operation of S602 is complete, the routine proceeds to S603.

In S603, a judgment is made on whether or not tank internal pressure within the hydrogen tank 120 detected by a pressure sensor 26 is greater than or equal to a predetermined pressure P0, as with S205. In case of affirmative judgment, the routine proceeds to S604; whereas in case of negative judgment, the operations from S601 and later are performed again. In S604, supply of hydrogen gas from the hydrogen gas supply system 200 to the fuel cell system 100 is stopped. The routine then proceeds to S605, where it is made sure that the hydrogen gas supply system 200 and the fuel cell system 100 are disconnected into a separated state. This allows for generation of power by the fuel cell 10 while the vehicle 1 is in a self-run. Once the operation of S605 is complete, the routine proceeds to S606.

In S606, in the fuel cell 10 that is now capable of generating power, generation of power for self-run of the vehicle 1 and addition of odorant by the odorant addition devices 105, 115, 125 to hydrogen gas to be provided to the fuel cell 10 are initiated. Note that in this addition of odorant, the ECU 20 controls each of the odorant addition devices and adjusts mode of odorant addition according to the mix ratio between odorants that was determined and stored in the ECU 20 in S602.

According to the present control, mix ratio between odorants is determined in the fuel cell system 100 that receives supply of hydrogen gas, based on the locational information of the hydrogen gas supply system 200, so that odorant contained in hydrogen gas to be used in the fuel cell 10 is in a suitable state, which contributes well to more reliable detection of hydrogen gas leakage. Further, in the present control, mode of odorant addition can be adjusted even if no sensor or the like for the detection of environmental condition is provided on the fuel cell system 100's side.

The invention claimed is:

1. An odorant addition device for adding odorant to hydrogen gas in a fuel cell system, the device comprising:
   an ECU configured to execute the following steps:
      add the odorant to hydrogen gas to be consumed by the fuel cell system;
      detect a history of hydrogen gas consumption in the fuel cell system, the history of hydrogen gas consumption being related with a deterioration of the fuel cell system; and
      adjust, based on the history of hydrogen gas consumption, at least one of amount of odorant to be added in hydrogen gas, concentration of the odorant, type of odorant to be added, mix ratio between odorants if multiple types of odorants are added, in order to enable a user outside the fuel cell system to detect leakage of hydrogen gas.

2. An odorant addition device in accordance with claim 1, wherein the ECU is configured to control the amount of odorant to be added based on the history of hydrogen gas consumption.

3. An odorant addition device in accordance with claim 1, wherein:
   the ECU is configured to execute the steps:
      add multiple types of odorants having different odor characteristics to the hydrogen gas to be consumed by the fuel cell system, and
      adjust the mix ratio between the respective odorants to be added based on the history of hydrogen gas consumption.

4. An odorant addition device in accordance with claim 1, wherein the fuel cell system receives supply of the hydrogen gas to be consumed within the fuel cell system from a hydrogen gas supply system that is arranged outside the fuel cell system, and
   the addition of odorant is performed on at least one of the fuel cell system's side and the hydrogen gas supply system's side.

* * * * *